United States Patent
Bao et al.

(10) Patent No.: US 11,671,859 B2
(45) Date of Patent: Jun. 6, 2023

(54) CUSTOMIZED FUNCTION BLOCK SHARING IN WIRELESS COMMUNICATIONS SYSTEMS

(71) Applicant: QUALCOMM Incorporated, San Diego, CA (US)

(72) Inventors: Jingchao Bao, San Diego, CA (US); Sony Akkarakaran, Poway, CA (US); Hamed Pezeshki, San Diego, CA (US); Tao Luo, San Diego, CA (US); Taesang Yoo, San Diego, CA (US); Arumugam Chendamarai Kannan, San Diego, CA (US); Ajay Gupta, San Diego, CA (US); Mahmoud Taherzadeh Boroujeni, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 17/161,348

(22) Filed: Jan. 28, 2021

(65) Prior Publication Data
US 2021/0243633 A1    Aug. 5, 2021

Related U.S. Application Data

(60) Provisional application No. 62/968,045, filed on Jan. 30, 2020.

(51) Int. Cl.
*H04W 24/10* (2009.01)
*H04B 7/06* (2006.01)
(Continued)

(52) U.S. Cl.
CPC .............. *H04W 24/10* (2013.01); *G06N 3/02* (2013.01); *H04B 7/0626* (2013.01);
(Continued)

(58) Field of Classification Search
CPC ............ H04W 24/10; H04W 72/0413; H04W 72/042; H04W 72/21; H04W 72/23; G06N 3/02; H04B 7/0626; H04L 5/0035
(Continued)

(56) References Cited

U.S. PATENT DOCUMENTS

| 2019/0021018 A1 | 1/2019 | Nagaraja et al. |
| 2019/0140796 A1 | 5/2019 | Wang et al. |

(Continued)

FOREIGN PATENT DOCUMENTS

| EP | 2384049 A1 | 11/2011 |
| KR | 20190106950 A | 9/2019 |

OTHER PUBLICATIONS

International Search Report and Written Opinion—PCT/US2021/015875—ISA/EPO—dated Apr. 19, 2021 (201127WO).

*Primary Examiner* — Obaidul Huq
(74) *Attorney, Agent, or Firm* — Dalei Dong; Holland & Hart LLP

(57) ABSTRACT

Methods, systems, and devices for wireless communications are described. A base station may explicitly or implicitly identify one or more parameters associated with a user equipment (UE), and may classify the UE into a cluster of UEs based on identifying the one or more parameters. The base station may determine a customized function block based on classifying the UE into the cluster of UEs. For example, the base station may determine the customized function block based on determining whether the cluster of UEs is associated with a pre-trained customized function block. The base station may then transmit the customized function block to the UE. The UE may receive the customized function block and may process one or more signals at the UE based on the received customized function block.

24 Claims, 17 Drawing Sheets

(51) Int. Cl.
  *G06N 3/02* (2006.01)
  *H04L 5/00* (2006.01)
  *H04W 72/21* (2023.01)
  *H04W 72/23* (2023.01)

(52) U.S. Cl.
  CPC ........... *H04L 5/0035* (2013.01); *H04W 72/21* (2023.01); *H04W 72/23* (2023.01)

(58) Field of Classification Search
  USPC ........................................ 370/310, 328, 329
  See application file for complete search history.

(56) References Cited

U.S. PATENT DOCUMENTS

| | | | |
|---|---|---|---|
| 2020/0008041 A1* | 1/2020 | Zhang | H04W 8/02 |
| 2020/0151798 A1 | 5/2020 | Sim et al. | |
| 2020/0364187 A1* | 11/2020 | Tran | H04W 64/00 |
| 2021/0158151 A1* | 5/2021 | Wang | G06N 3/04 |
| 2022/0078637 A1* | 3/2022 | Tullberg | G06N 20/00 |

* cited by examiner

CUSTOMIZED FUNCTION BLOCK SHARING IN WIRELESS COMMUNICATIONS SYSTEMS

CROSS REFERENCE

The present application for patent claims the benefit of U.S. Provisional Patent Application No. 62/968,045 by BAO et al., entitled "CUSTOMIZED FUNCTION BLOCK SHARING IN WIRELESS COMMUNICATIONS SYSTEMS," filed Jan. 30, 2020, assigned to the assignee hereof, and expressly incorporated herein.

FIELD OF DISCLOSURE

The following relates generally to wireless communications, and more specifically to customized function block sharing in wireless communications systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support customized function block sharing in wireless communications systems. In some examples, the described techniques provide for sharing a customized function block among multiple user equipments (UEs) having same or similar features (e.g., multiple UEs associated with same or similar parameters). A base station may identify one or more parameters associated with a UE, and may classify the UE in a cluster of UEs. The base station may then determine a customized function block associated with the cluster of UEs, and may indicate the customized function block to the UE. The UE may receive the customized function block, and may process one or more signals generated by the UE using the customized function block. The UE may also provide feedback information (e.g., when requested by the base station) indicating additional training data after applying the customized function block. The base station may use the feedback information when to update the customized function block for one or more served UEs to improve performance by the customized function block.

A method of wireless communication at a UE is described. The method may include receiving, from a base station, a request for a parameter associated with the UE, transmitting, to the base station, a report indicating the requested parameter in response to receiving the request, receiving, from the base station, a customized function block based on the transmitting the report, and processing one or more signals at the UE based on the received customized function block.

An apparatus for wireless communication at a UE is described. The apparatus may include a processor, memory coupled with the processor, and instructions stored in the memory. The instructions may be executable by the processor to cause the apparatus to receive, from a base station, a request for a parameter associated with the UE, transmit, to the base station, a report indicating the requested parameter in response to receiving the request, receive, from the base station, a customized function block based on the transmitting the report, and process one or more signals at the UE based on the received customized function block.

Another apparatus for wireless communication at a UE is described. The apparatus may include means for receiving, from a base station, a request for a parameter associated with the UE, transmitting, to the base station, a report indicating the requested parameter in response to receiving the request, receiving, from the base station, a customized function block based on the transmitting the report, and processing one or more signals at the UE based on the received customized function block.

A non-transitory computer-readable medium storing code for wireless communication at a UE is described. The code may include instructions executable by a processor to receive, from a base station, a request for a parameter associated with the UE, transmit, to the base station, a report indicating the requested parameter in response to receiving the request, receive, from the base station, a customized function block based on the transmitting the report, and process one or more signals at the UE based on the received customized function block.

In some examples of the method, apparatuses, and non-transitory computer-readable medium described herein, the UE may be included in a cluster of UEs associated with the same customized function block. Some examples of the method, apparatuses, and non-transitory computer-readable medium described herein may further include operations, features, means, or instructions for receiving, from the base station and after receiving the customized function block, a second request for an additional parameter associated with the UE, and transmitting, to the base station, a second report indicating the additional parameter based on receiving the second request.

Some examples of the method, apparatuses, and non-transitory computer-readable medium described herein may further include operations, features, means, or instructions for receiving, from the base station, an updated customized function block, where the updated customized function block may be based on the additional parameter associated with the UE, and processing a second signal at the UE based on the updated customized function block.

Some examples of the method, apparatuses, and non-transitory computer-readable medium described herein may further include operations, features, means, or instructions for receiving, from the base station, an updated customized function block, where the updated customized function block may be based on the requested parameter associated with the UE, and processing a second signal at the UE based on the updated customized function block.

In some examples of the method, apparatuses, and non-transitory computer-readable medium described herein, the customized function block includes a default function block.

Some examples of the method, apparatuses, and non-transitory computer-readable medium described herein may further include operations, features, means, or instructions for receiving, from the base station, a second request to perform a handover to a second base station, and performing the handover to the second base station in response to receiving the second request.

Some examples of the method, apparatuses, and non-transitory computer-readable medium described herein may further include operations, features, means, or instructions for receiving, from the second base station, the customized function block based on performing the handover.

Some examples of the method, apparatuses, and non-transitory computer-readable medium described herein may further include operations, features, means, or instructions for receiving, from the second base station, an updated customized function block based on performing the handover.

Some examples of the method, apparatuses, and non-transitory computer-readable medium described herein may further include operations, features, means, or instructions for measuring the requested parameter associated with the UE based on receiving the request, and including the requested parameter in the report based on the measuring.

In some examples of the method, apparatuses, and non-transitory computer-readable medium described herein, receiving the request for the parameter may include operations, features, means, or instructions for receiving the request via at least one of a downlink control information (DCI), a radio resource control (RRC) signal, a medium access control (MAC) control element, or a combination thereof.

In some examples of the method, apparatuses, and non-transitory computer-readable medium described herein, transmitting the report indicating the requested parameter may include operations, features, means, or instructions for transmitting the report indicating the requested parameter via at least one of a MAC control element, an uplink control information (UCI), a physical uplink shared channel (PUSCH), or a combination thereof.

In some examples of the method, apparatuses, and non-transitory computer-readable medium described herein, the requested parameter includes at least one of a location associated with the UE, a brand associated with the UE, a modem type associated with the UE, an antenna panel number associated with the UE, an antenna configuration associated with the UE, or a combination thereof.

In some examples of the method, apparatuses, and non-transitory computer-readable medium described herein, processing the one or more signals at the UE may include operations, features, means, or instructions for performing, at the UE, an operation associated with the signal, the operation including at least one of a channel estimation, a channel state information compression, a coding, a decoding, or a combination thereof.

In some examples of the method, apparatuses, and non-transitory computer-readable medium described herein, receiving the customized function block may include operations, features, means, or instructions for receiving the customized function block via at least one of a physical downlink shared channel (PDSCH), an RRC signal, a DCI, or a combination thereof.

In some examples of the method, apparatuses, and non-transitory computer-readable medium described herein, the customized function block includes a pretrained customized function block for a cluster of UEs associated with the requested parameter.

In some examples of the method, apparatuses, and non-transitory computer-readable medium described herein, the customized function block includes a function block customized using at least one of a neural network algorithm, an artificial intelligence algorithm, a reinforcement learning algorithm, or a combination thereof.

A method of wireless communication at a base station is described. The method may include identifying one or more parameters associated with a UE, classifying the UE into a cluster of UEs based on identifying the one or more parameters, determining a customized function block based on classifying the UE into the cluster of UEs, and transmitting, to the UE, the customized function block based on determining the customized function block.

An apparatus for wireless communication at a base station is described. The apparatus may include a processor, memory coupled with the processor, and instructions stored in the memory. The instructions may be executable by the processor to cause the apparatus to identify one or more parameters associated with a UE, classify the UE into a cluster of UEs based on identifying the one or more parameters, determine a customized function block based on classifying the UE into the cluster of UEs, and transmit, to the UE, the customized function block based on determining the customized function block.

Another apparatus for wireless communication at a base station is described. The apparatus may include means for identifying one or more parameters associated with a UE, classifying the UE into a cluster of UEs based on identifying the one or more parameters, determining a customized function block based on classifying the UE into the cluster of UEs, and transmitting, to the UE, the customized function block based on determining the customized function block.

A non-transitory computer-readable medium storing code for wireless communication at a base station is described. The code may include instructions executable by a processor to identify one or more parameters associated with a UE, classify the UE into a cluster of UEs based on identifying the one or more parameters, determine a customized function block based on classifying the UE into the cluster of UEs, and transmit, to the UE, the customized function block based on determining the customized function block.

Some examples of the method, apparatuses, and non-transitory computer-readable medium described herein may further include operations, features, means, or instructions for determining that the cluster of UEs may be associated with a pretrained customized function block, where the customized function block includes the pretrained customized function block, transmitting, to the UE and after transmitting the customized function block, a request for an additional parameter associated with the UE, and receiving, from the UE, a report indicating the additional parameter based on transmitting the request.

Some examples of the method, apparatuses, and non-transitory computer-readable medium described herein may further include operations, features, means, or instructions for determining an updated customized function block based on receiving the additional parameter associated with the UE, and transmitting, to the UE, the updated customized function block based on determining the updated customized function block.

Some examples of the method, apparatuses, and non-transitory computer-readable medium described herein may further include operations, features, means, or instructions for determining that the cluster of UEs may be not associated with a pretrained customized function block, where transmitting the customized function block includes transmitting a default function block, determining an updated customized function block based on the one or more parameters associated with the UE, and transmitting, to the UE, the updated customized function block based on determining the updated customized function block.

Some examples of the method, apparatuses, and non-transitory computer-readable medium described herein may further include operations, features, means, or instructions for identifying the one or more parameters associated with a second UE, classifying the second UE into the cluster of UEs based on identifying the one or more parameters, and transmitting, to the second UE, the customized function block based on classifying the second UE into the cluster of UEs.

Some examples of the method, apparatuses, and non-transitory computer-readable medium described herein may further include operations, features, means, or instructions for transmitting, to a second base station, a handover request to handover the UE from the base station to the second base station, receiving, from the second base station, a handover response based on the handover request, and transmitting, to the second base station and based on receiving the handover response, the customized function block.

In some examples of the method, apparatuses, and non-transitory computer-readable medium described herein, transmitting the customized function block to the second base station may include operations, features, means, or instructions for transmitting, to the second base station, the customized function block via at least one of an Xn interface, a server, a component of a core network, or a combination thereof.

Some examples of the method, apparatuses, and non-transitory computer-readable medium described herein may further include operations, features, means, or instructions for transmitting, to a second base station, a handover request to handover the UE from the base station to the second base station, receiving, from the second base station, a handover response based on the handover request, and transmitting, to the second base station, the one or more parameters associated with the UE based on receiving the handover response.

In some examples of the method, apparatuses, and non-transitory computer-readable medium described herein, identifying the one or more parameters associated with the UE may include operations, features, means, or instructions for identifying at least one of an estimated location associated with the UE, a trajectory associated with the UE, a motion behavior associated with the UE, a channel condition associated with the UE, or a combination thereof.

In some examples of the method, apparatuses, and non-transitory computer-readable medium described herein, identifying the one or more parameters associated with the UE may include operations, features, means, or instructions for transmitting, to the UE, a request for the one or more parameters associated with the UE, and receiving, from the UE, a report indicating the requested one or more parameters, where classifying the UE into the cluster of UEs may be based on the received one or more parameters.

In some examples of the method, apparatuses, and non-transitory computer-readable medium described herein, transmitting the request for the one or more parameters may include operations, features, means, or instructions for transmitting the request via at least one of a DCI, a RRC signal, a MAC control element, or a combination thereof.

In some examples of the method, apparatuses, and non-transitory computer-readable medium described herein, receiving the report indicating the requested one or more parameters may include operations, features, means, or instructions for receiving the report indicating the requested one or more parameters via at least one of a MAC control element, an UCI, a PUSCH, or a combination thereof.

In some examples of the method, apparatuses, and non-transitory computer-readable medium described herein, the requested one or more parameters includes at least one of a location associated with the UE, a brand associated with the UE, a modem type associated with the UE, an antenna panel number associated with the UE, an antenna configuration associated with the UE, or a combination thereof.

In some examples of the method, apparatuses, and non-transitory computer-readable medium described herein, transmitting the customized function block may include operations, features, means, or instructions for transmitting the customized function block via at least one of a PDSCH, a RRC signal, a DCIDCI, or a combination thereof.

In some examples of the method, apparatuses, and non-transitory computer-readable medium described herein, the customized function block includes a function block customized using at least one of a neural network algorithm, an artificial intelligence algorithm, a reinforcement learning algorithm, or a combination thereof.

DETAILED DESCRIPTION

Figure 1:
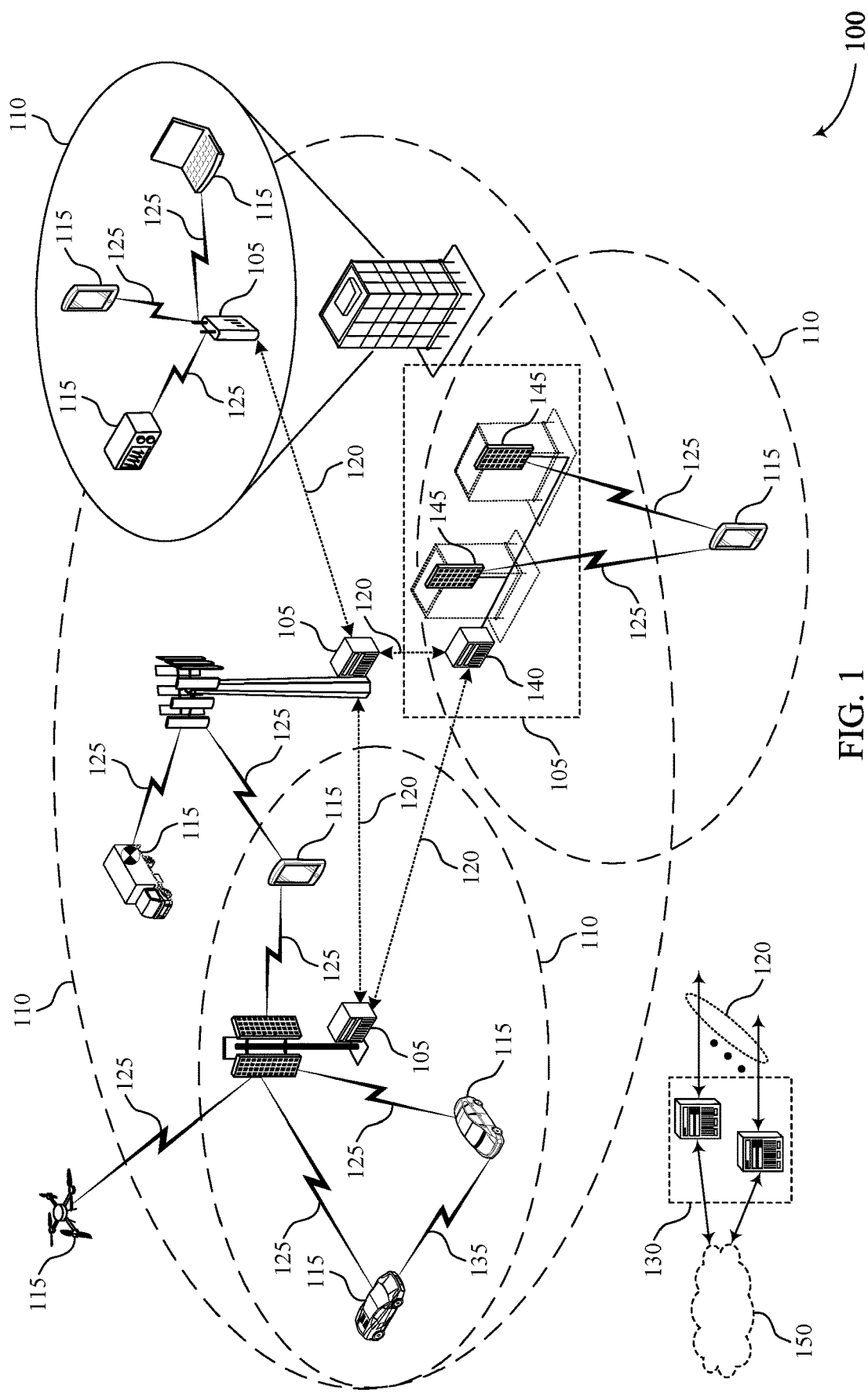
FIG. 1 illustrates an example of a wireless communications system that supports customized function block sharing in wireless communications systems in accordance with various aspects of the present disclosure.

Some wireless communications systems may include communication devices, such as user equipments (UEs) and base stations, for example, eNodeBs (eNBs), next-generation NodeBs or giga-NodeBs (either of which may be referred to as a gNB) that may support multiple radio access technologies. Examples of radio access technologies include 4G systems such as Long Term Evolution (LTE) systems and fifth generation (5G) systems which may be referred to as New Radio (NR) systems. The communication devices may, in some examples, support one or more of the above example radio access technologies. Providing one-to-one service enhancements to each UE in a wireless communications system may be time-intensive, may result in a high overhead signaling cost, and may use a large amount of computational resources.

A wireless communications system may support the use of customized function blocks. For example, a UE may perform one or more functions by applying one or more customized function blocks to a signal. Using customized function blocks may increase reliability of some communications and improve signal throughput. For example, a UE may determine or estimate channel conditions by using customized function blocks. Additionally or alternatively, a base station may assist one or more UEs to utilize one or more customized function blocks to fit a local environment and one or more parameters associated with the UEs. In some examples, the base station may reuse a customized function block for multiple UEs. That is, the base station may configure a cluster of UEs to use the customized function block while processing a signal. In some cases, a UE included in the cluster of UEs may use the customized function block to perform an operation associated with a signal. The operation may include at least one of a channel estimation, a channel state information compression, a coding, a decoding, or a combination thereof. In one example, the customized function block may include a function block customized using at least one of a neural network algorithm, an artificial intelligence algorithm, a reinforcement learning algorithm, or a combination thereof.

A base station may implicitly or explicitly identify one or more parameters associated with a UE. The base station may then classify the UE into a cluster of UEs based on identifying the one or more parameters. In some examples, the base station may determine a customized function block based on classifying the UE into the cluster of UEs. For instance, the base station may determine whether the cluster of UEs is associated with a pre-trained customized function block. If the base station determines that the cluster of UEs is not associated with a pre-trained customized function block, then the base station may transmit a default function block to the UE. Alternatively, if the base station determines that the cluster of UEs is associated with a pre-trained customized function block, then the base station may transmit the pre-trained customized function block to the UE. The base station may transmit such function blocks (e.g., a default function block or a pre-trained customized function block) via at least one of a physical downlink shared channel (PDSCH), a radio resource control (RRC) signal, a DCI, or the like. In some cases, the base station may train a customized function block after transmitting the default function block, and the UE may utilize the customized function block instead of the default function block. For example, upon receiving the customized function block (or the pre-trained customized function block), the UE may update an existing function block according to the received customized function block. Having updated the function block, the UE may process a signal at the UE based on the received customized function block.

Aspects of the subject matter described in this disclosure may be implemented to realize one or more of the following potential advantages. The techniques employed by the described one or more communication devices may provide benefits and enhancements to the operation of the communication devices. For example, operations performed by the described one or more communication devices may result in increased throughput, increased reliability of signaling, increased system efficiency and improved user experience. As such, supported techniques may include improved network operations and, in some examples, may promote device and network efficiencies, among other benefits.

Aspects of the disclosure are initially described in the context of a wireless communications system. Aspects of the disclosure are further illustrated by and described with reference to architectures, and process flows. Aspects of the disclosure are further illustrated by and described with reference to apparatus diagrams, system diagrams, and flowcharts that relate to customized function block sharing in wireless communications systems.

FIG. 1 illustrates an example of a wireless communications system 100 that supports customized function block sharing in wireless communications systems in accordance with various aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/$ ($\Delta f_{max} \cdot N_f$) seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell may cover a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some examples, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). In some examples, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at one or more orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A medium access control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of the RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Existing wireless communications systems do not provide for the use of customized function blocks (or models) shared by multiple UEs. For instance, existing wireless communications systems do not provide customized service enhancements to one or more UEs. In some examples, a base station operating in existing wireless communications systems may provide one-to-one service to a UE. However, providing one-to-one service may be time-intensive, may result in a high overhead signaling cost, and may use a large amount of computational resources.

According to one or more aspects of the present disclosure, a base station 105 may identify (implicitly or explicitly) one or more parameters associated with a UE 115, and may classify the UE 115 in a cluster of UEs. The base station 105 may determine a customized function block associated with the cluster of UEs, and may indicate the customized function block to the UE 115. The UE 115 may receive the customized function block, and may process one or more signals generated by the UE 115 using the customized function block. Processing signals using a customized function block may result in improved throughput, increased system efficiency, and improved user experience.

Figure 2:
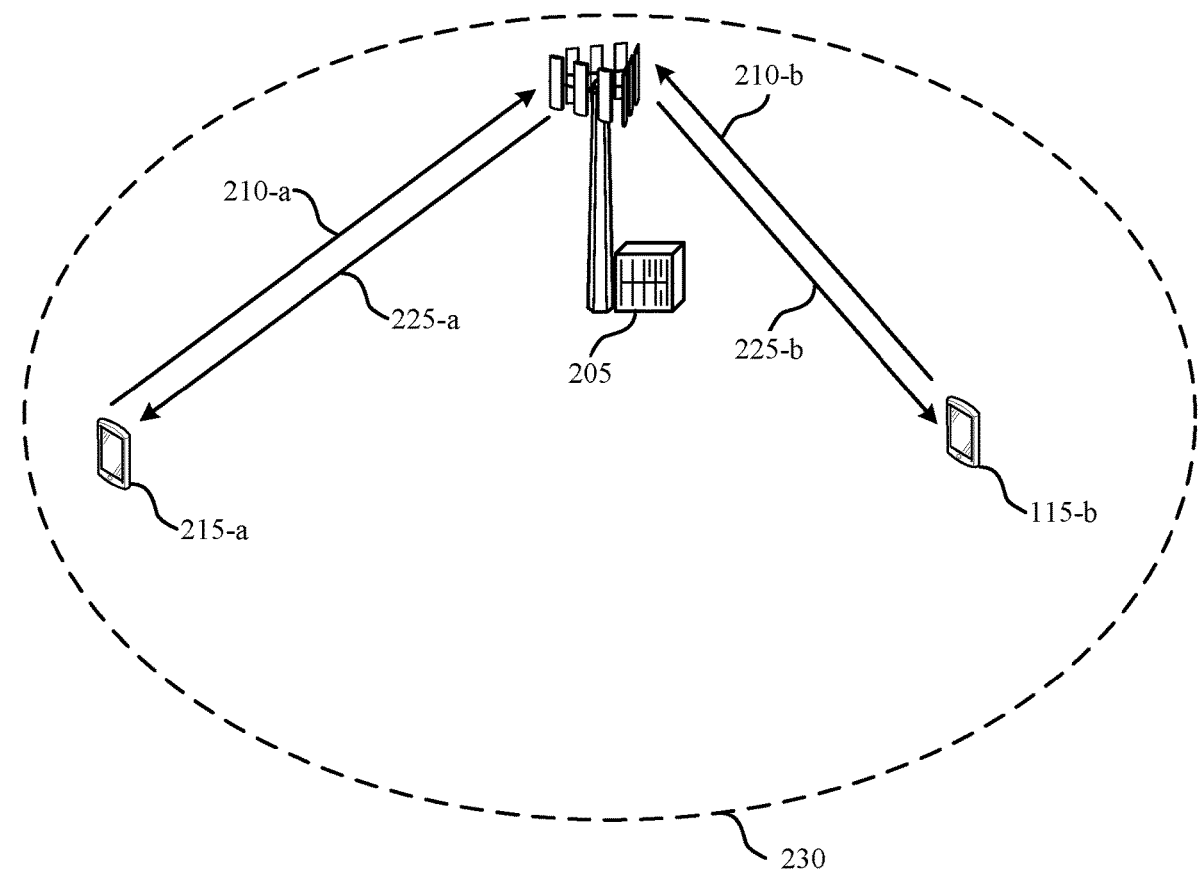
FIG. 2 illustrates an example of a wireless communications system that supports customized function block sharing in wireless communications systems in accordance with various aspects of the present disclosure.

FIG. 2 illustrates an example of a wireless communications system 200 that supports customized function block sharing in wireless communications systems in accordance with various aspects of the present disclosure. In some examples, wireless communications system 200 may implement aspects of wireless communications system 100. The wireless communications system 200 may include a base station 205 and UEs 215 (e.g., UE 215-a and UE 215-b) within a geographic coverage area 230. The base station 205, the UE 215-a, and the UE 215-b may be examples of base stations 105 and UEs 115 as described herein (e.g., with reference to FIG. 1). In some examples, the wireless communications system 200 may support multiple radio access technologies including 4G systems such as LTE systems, LTE-A systems, or LTE-A Pro systems, and 5G systems which may be referred to as NR systems or NR communications systems. In some examples, the wireless communications system 200 may implement aspects of the wireless communications system 100 to support improvements to power consumption, spectral efficiency, higher data rates and, in some examples, may promote enhanced efficiency for high reliability and low latency communication operations, among other benefits.

According to one or more aspects, the wireless communications system 200 may support the use of customized function blocks (such as function block customized using at least one of a neural network algorithm, an artificial intelligence algorithm, a reinforcement learning algorithm, or a combination thereof) for processing a signal. For example, the UE 215 (e.g., UE 215-a, UE 115-b, etc.) may perform one or more functions (e.g., process one or more signals, perform an operation associated with the signal, etc.) using one or more customized function blocks to a signal. Using the customized function blocks may increase reliability of some communications and improve signal throughput. In some examples, the base station 205 may train or develop a customized function block based on parameters associated with a UE. In some examples, the base station 205 may group together multiple UEs (or classify multiple UEs in a common cluster) based on one or more common parameters, and the base station 205 may indicate a common customized function block to the UEs in a group (or cluster). In some examples, a UE 215-a may process a signal to determine or estimate channel conditions by using a customized function block (such as a customized function block indicated by the base station 205).

Existing wireless communications systems do not provide for the use of customized function blocks (or models) shared by multiple UEs. For instance, existing wireless communications systems do not describe providing customized service enhancements to one or more UEs. Specifically, existing wireless communications systems provide one-to-one service to each UE. That is, a base station may provide service tailored to a UE. However, providing one-to-one service entails a use of a large amount of resources. For instance, training or developing one-to-one customized service enhancements may be time-intensive, may result in a high overhead signaling cost, and may use a large amount of computational resources. Therefore, it may be desirable to minimize the computational resources by creating common customized function blocks (or models) for UEs having similar or same behavioral parameters. That is, multiple UEs associated with similar or same parameters (such as number of antennas, number of modems, etc.) may use the same customized function blocks (or models) to perform some operations.

According to one or more aspects of the present disclosure, the techniques described herein address enabling the use of shared customized function blocks (or models, neural network blocks, etc.) to provide customized service enhancements for different UEs. According to some examples, the base station 205 may assist one or more UEs 215 (e.g., UE 215-*a* and UE 215-*b*) to utilize one or more customized function blocks to fit the local environment and additional parameters of the UEs 215. In some examples, the base station 205 may assist the UEs 215 in training and applying one or more customized function blocks. That is, the UEs 215 (e.g., UE 215-*a* and UE 215-*b*) may be able to offload the computation to the base station 205. The base station 205 may utilize one or more parameters associated with each of the UEs 215 (e.g., UE 215-*a* and UE 215-*b*), and may provide customized function blocks to the UEs 215 (e.g., UE 215-*a* and UE 215-*b*).

In some cases, the base station 205 may provide customized service to a UE 215 (e.g., UE 215-*a* and/or UE 215-*b*) using one or more algorithms to learn an environment of the UE 215 (e.g., UE 215-*a* and/or UE 215-*b*). In some cases, the base station 205 may then provide services customized to one or more UEs 215 (e.g., UE 215-*a* and/or UE 215-*b*) instead of providing the same services for all UEs 215 (e.g., UE 215-*a* and/or UE 215-*b*). In some examples, the base station 205 may use artificial intelligence to learn or determine a customized function block for a UE 215 (e.g., UE 215-*a* and/or UE 215-*b*). Additionally or alternatively, the base station 205 may indicate the customized function block to the UE 215 (e.g., UE 215-*a* and/or UE 215-*b*). For instance, the base station 205 may configure the UE 215 (e.g., UE 215-*a* and/or UE 215-*b*) to use the customized function block while processing a signal. In some cases, the UE 215 (e.g., UE 215-*a* and/or UE 215-*b*) may use the customized function block to perform an operation associated with the signal. The operation may include at least one of a channel estimation, a channel state information compression, a coding, a decoding, or a combination thereof. In one example, the customized function block may include a function block customized using at least one of a neural network algorithm, an artificial intelligence algorithm, a reinforcement learning algorithm, or a combination thereof. That is, the channel estimation operation, the channel state information compression operation, the coding operation, the decoding operation may be customized by one or more of the neural network algorithm, the artificial intelligence algorithm, the reinforcement learning algorithm, or the combination thereof. Additionally or alternatively, one or more aspects of the present disclosure may provide for reuse of pre-trained customized function blocks for similar UEs (e.g., UE 215-*a* and/or UE 215-*b*) served by one base station.

In some aspects, a pre-trained customized function block may be reused by multiple base stations.

Each customized function block may be configured and trained to perform one or more functions. For example, the UE 215-*a* may perform channel estimation procedures using a channel estimation customized function block. Each customized function block may be defined by a number of customized function block parameters. The customized function block parameters may include a number of layers, a number of nodes in each layer, a mapping between the respective nodes of each layer, an activation function for one or more of the nodes of the customized function block, a deactivation function for one or more of the nodes of the customized function block, one or more weight values, bias values, or the like.

In some examples, the base station 205, the UE 215-*a*, and the UE 215-*b* may communicate parameter information, customized function block, or other signals, or combinations thereof to support customized function blocks used by each UE 215 to perform various functions. In one example, the base station 205 may identify one or more parameters associated with a UE 215 (e.g., UE 215-*a* and UE 215-*b*). In one example, the base station 205 may implicitly (without explicit signaling) identify the one or more parameters. In another example, the base station 205 may explicitly request a UE 215 (e.g., UE 215-*a* and/or UE 215-*b*) to report the one or more parameters. In one example, the base station 205 may explicitly request the one or more parameters from UE 215-*a*, and the base station 205 may implicitly determine the one or more parameters for UE 215-*b*. In case of the explicit request, the base station 205 may transmit, to a UE 215-*a*, a request (via a downlink signal 225-*a*) for the one or more parameters associated with the UE 215-*a*. The downlink signal 225-*a* may include at least one of a DCI, an RRC signal, a MAC control element, or a combination thereof. The UE 215-*a* may receive the request (via downlink signal 225-*a*), and may measure the requested parameter associated with the UE 215-*a* based on receiving the request. In some cases, the requested parameter may include at least one of a location associated with the UE 215-*a*, a brand associated with the UE 215-*a*, a modem type associated with the UE 215-*a*, an antenna panel number associated with the UE 215-*a*, an antenna configuration associated with the UE 215-*a*, or a combination thereof. The UE 215-*a* may then include the requested parameter in a report, and may transmit the report indicating the requested parameter in response to receiving the request. In some examples, the UE 215-*a* may transmit the report using uplink signal 210-*a*. The uplink signal 210-*a* may include at least one of a MAC control element, an UCI, a PUSCH, or a combination thereof. In some examples, the UE 215-*a* may be referred to as a proactive UE.

In one example of implicitly identifying one or more parameters associated with the UE 215-*b*, the base station 205 may identify at least one of an estimated location associated with the UE 215-*b*, a trajectory associated with the UE 215-*b*, a motion behavior associated with the UE 215-*b*, a channel condition associated with the UE 215-*b*, or a combination thereof. In some cases, the UE 215-*b* may not transmit a report to the base station 205. Instead, the base station 205 may gather information about the UE 215-*b*. In one example, the base station 205 may determine that the UE 215-*b* is served by the same beam as another UE (not shown). The base station 205 may determine that the UE 215-*b* is located in the same area as the other UE. Additionally or alternatively, the base station 205 may determine whether a channel between the UE 215-*b* and the base station 205 is stable. If the channel between the UE 215-*b* and the base station 205 is stable, then the base station 205 may determine that the UE 215-*b* is stationary or moving at a slow pace. In some examples, if the channel between the UE 215-*b* and the base station 205 is changing, then the base station 205 may determine that the UE 215-*b* is moving at a high pace. In some examples, the base station 205 may maintain a log of UE behavior, and may identify the one or more parameters associated with the UE 215-*b* using the log. In some examples, the base station 205 may receive the log of UE behavior from a higher layer server (e.g., an entity of the core network).

According to one or more aspects, the base station 205 may classify the UEs 215 (e.g., UE 215-*a* and/or UE 215-*b*) into a cluster of UEs based on identifying (implicitly or explicitly) the one or more parameters. In one example, the base station 205 may classify the UE 215-*a* and the UE 215-*b* in a common cluster. For instance, the base station 205 may determine the location of the UE 215-*a* based on the report transmitted by the UE 215-*a*. Additionally, the base station 205 may implicitly determine a location of the UE 215-*b*. In some examples, the base station 205 may determine that the UE 215-*a* and the UE 215-*b* are located within the same geographic area 230. The base station 205 may classify the UE 215-*a* and the UE 215-*b* into the same cluster based on determining that the UE 215-*a* and the UE 215-*b* are located in the same geographic area 230. In an alternative example, the base station 205 may classify the UE 215-*a* and the UE 215-*b* in separate clusters (based on modems, antennas, etc.).

In some examples, the base station 205 may determine a customized function block based on classifying the UEs 215 (e.g., UE 215-*a* and/or UE 215-*b*) into the cluster of UEs. The customized function block implemented by the UEs 215 (e.g., UE 215-*a* and/or UE 215-*b*) may include a single customized function block that is configurable to perform one or more different functions, a default customized function block or traditional function block (e.g., a function block for performing one or more functions by the modem of the UE that is not a customized function block), a list of pre-trained customized function block from which base station 105-*a* can select a customized function block, or the like.

In order to determine the customized function block, the base station 205 may first determine whether the cluster of UEs is associated with a pre-trained customized function block. As described herein, the cluster of UEs may include the UE 215-*a* and the UE 215-*b*. In one example, the base station 205 may determine that the cluster of UEs is associated with the pre-trained customized function block. In such an example, the base station 205 may transmit the pre-trained customized function block to the UE 215-*a* and the UE 215-*b*. The base station 205 may transmit the pre-trained customized function block to the UE 215-*a* and the UE 215-*b* to reconfigure a function block with configuration options associated with the pre-trained customized function block that is capable of being implemented by the UE 215-*a* and the UE 215-*b*. In some examples, the base station 205 may transmit the pre-trained customized function block via at least one of a PDSCH, an RRC signal, a DCI, or a combination thereof.

Alternatively, the base station 205 may determine that the cluster of UEs is not associated with the pre-trained customized function block. In such cases, the base station 205 may transmit a default function block to the UE 215-*a* and the UE 215-*b*. The base station 205 may then determine whether a function block can be customized (or trained) in real time. If the base station 205 determines that a function block cannot be customized in real time, then the base station 205, the UE 215-*a*, and the UE 215-*b* may continue to use the default function block. In some cases, the base station 205 may request additional information from the UE 215-*a* and/or the UE 215-*b* (e.g., for training purposes). On the other hand, if the base station 205 determines that a function block can be customized in real time, then the base station 205, the UE 215-*a*, and the UE 215-*b* may continue to use the default function block until the function block is customized. The base station 205 may then transmit the customized function block to the UE 215-*a* and the UE 215-*b*. For example, the base station 205 may transmit the customized function block to configure the UE 215-*a* and the UE 215-*b* (as the UE 215-*a* and the UE 215-*b* belong to the same cluster) with the customized function block in place of the default function block. The base station 205 may transmit the customized function block using at least one of a PDSCH, an RRC signal, a DCI, or a combination thereof. The UE 215-*a* and the UE 215-*b* may update the function block using the received customized function block. For instance, the UE 215-*a* and the UE 215-*b* may reconfigure the function block to process one or more signals according to the customized function block.

Having received the customized function block, the UE 215-*a* and the UE 215-*b* may process a signal generated by the UE 215-*a* and the UE 215-*b* from one or more over-the-air (OTA) wireless signals using the customized function block. For example, if the customized function block is associated with performing a channel estimation, the UE 215-*a* and the UE 215-*b* may receive one or more reference signals, combine and down convert signals, and generate a digital baseband signal. The UE 215-*a* and the UE 215-*b* may then extract relevant data from the digital baseband signal, and may process the digital baseband signal using the customized function block. In such examples, the UE 215-*a* and the UE 215-*b* may generate one or more outputs from the customized function block (e.g., raw or processed training data) which may represent channel estimation results for signal distortion correction, or may represent error corrections for detected distortions, or a combination thereof.

In some aspects, the base station 205 may request additional information from the UE 215-*a* and the UE 215-*b* for future enhancement. For example, the base station 205 may request training data from the UE 215-*a* and the UE 215-*b* (via downlink signal 225-*b*). In one example, in addition to sending the customized function block, the base station 205 may further refine the customized function block using the additional information (e.g., training data) received from the UE 215-*a*, or the UE 215-*b*, or both. The UE 215-*a* and the UE 215-*b* may report via an uplink signal (such as uplink signal 210-*b*) the requested additional information. In one example, the base station 205 may determine an updated customized function block based on the additional information received from the UE 215-*a*, or the UE 215-*b*, or both. The base station 205 may then transmit the updated customized function block to the UE 215-*a* and the UE 215-*b*. The UE 215-*a* and the UE 215-*b* may update the customized function block using the received updated customized function block. In some aspects, the base station 205 may refrain from transmitting the updated customized function block to the UE 215-*a* and the UE 215-*b*.

According to one or more aspects of the present disclosure, the base station 205 may transmit, to a target base station (not shown), a handover request to handover a UE 215 (e.g., UE 215-*a* or UE 215-*b*) from the base station 205 to the target base station. In response to transmitting the handover request, the base station 205 may receive a handover response from the target base station. For instance, the base station 205 may determine that the UE 215-*a* is to perform a handover to the target base station. In some cases, the base station 205 may identify a customized function block associated with the UE 215-*a*. The base station 205 may then transmit, to the target base station, the customized function block via at least one of an Xn interface, a server, a component of a core network, or a combination thereof. Additionally or alternatively, the base station 205 may determine one or more parameters (such as information) associated with the UE 215-*a*. The base station 205 may transmit the one or more parameters associated with the UE 215-*a* to the target base station. The target base station may then either reuse the customized function block during communication with the UE 215-*a*, or determine an updated customized function block for the UE 215-*a* based on a condition of the target base station and the one or more parameters indicated by the base station 205.

In one example, the base station 205 may indicate, to the UE 215-*a*, a request to perform a handover to the target base station. The UE 215-*a* may perform the handover to the target base station in response to receiving the request, and may then receive the customized function block from the target base station. Additionally or alternatively, the UE 215-*a* may receive an updated customized function block from the target base station. By sharing the customized function block between the source base station (or base station 205) and the target base station, the target base station may be able to reuse the customized function block, thereby saving on computational time and resources. Thus, the techniques described herein provide for increased throughput for the UEs 215 (e.g., UE 215-*a* and UE 215-*b*), improved channel measurements (e.g., by using customized services), increased system efficiency, and improved user experience.

Customized function blocks, as described herein, may be used to perform one or more operations (or functions). For example, a customized function block may be a channel estimation block, a channel state information compression block, a modulation block, a demodulation block, a coding block, a decoding block, or the like. That is, the customized function block may be used to perform at least one of a channel estimation, a channel state information compression, a modulation, a demodulation, a coding, a decoding, or a combination thereof. A customized function block, as described herein, may refer to illustrative examples where the customized function block is, for instance, a channel state information compression block. However, a customized function block as described herein may refer to any customized function block and may be similarly used (e.g., for channel estimation, modulation, demodulation, coding, decoding, etc.).

With reference to performing a channel state information compression, the base station 205, the UE 215-*a*, the UE 215-*b*, and an additional UE 215-*c* (not shown) and an additional UE 215-*d* (not shown) may utilize a CSINET algorithm. According to some aspects, the CSINET algorithm may learn a transformation from original channel matrices to compress representations (codewords) through training data. The CSINET algorithm may be agnostic to channel distribution and may instead directly learn to effectively use the channel structure from training data. Additionally, the CSINET algorithm may learn inverse transformation from codewords to original channels. Inverse transformation may be a noniterative process. In some aspects, the base station 205 may include 64 antenna elements. The base station 205 may determine that the UE 215-*a* and the UE 215-*b* each include a 2*2 antenna array. Additionally or alternatively, base station 205 may determine that the additional UE 215-*c* and the additional UE 215-*d* each include a 2*4 antenna array. The base station 205 may determine that the dimension of a channel matrix H is same (64*4) for the UE 215-*a* and the UE 215-*b*. Additionally or alternatively, the base station 205 may determine that the dimension of a channel matrix H is same (64*8) for the UE 215-*c* and the UE 215-*d* (not shown). In such an example, the base station 205 may reuse a first customized function block for the UE 215-*a* and the UE 215-*b*, and a second customized function block for the UE 215-*c* and the UE 215-*d*. That is, the UE 215-*a* and the UE 215-*b* may utilize the same customized function block for perform a channel state information compression. Additionally or alternatively, the UE 215-*c* and the UE 215-*d* may utilize the same customized function block for performing a channel state information compression.

Figure 3:
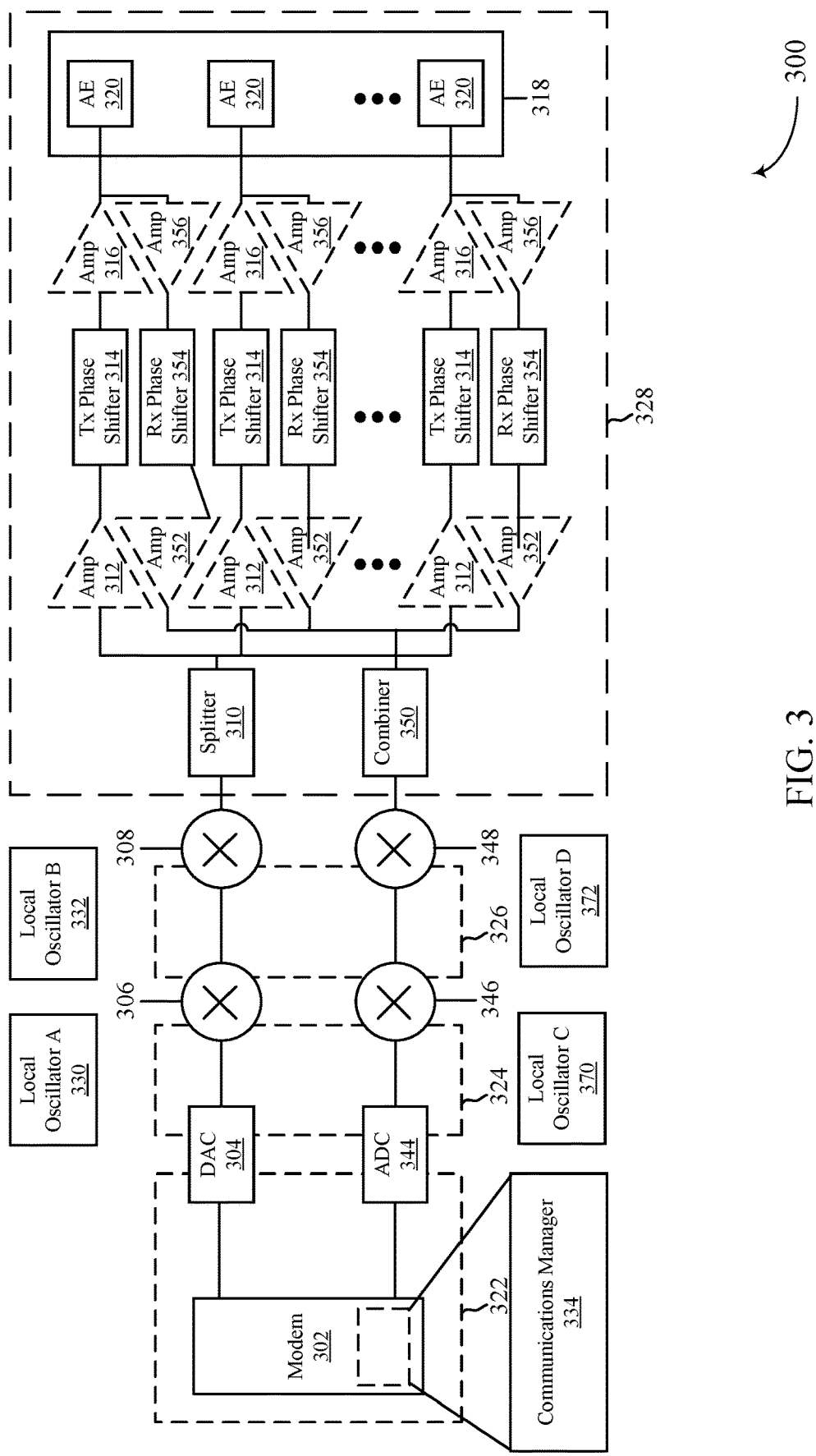
FIG. 3 illustrates an example of an architecture that supports customized function block sharing in wireless communications systems in accordance with various aspects of the present disclosure.

FIG. 3 illustrates an example of an architecture 300 that supports customized function block sharing in wireless communications systems in accordance with various aspects of the present disclosure. In some examples, the architecture 300 may implement aspects of wireless communications system 100 and wireless communications system 200. In some aspects, the architecture 300 may be an example of a transmitting device (e.g., a first wireless device, a UE 115, or a base station 105) and/or a receiving device (e.g., a second wireless device, a UE 115, or a base station 105) as described herein.

Broadly, FIG. 3 is a diagram illustrating example hardware components of a wireless device in accordance with some aspects of the disclosure. The illustrated components may include those that may be used for antenna element selection and/or for beamforming for transmission of wireless signals. The illustrated components may be used to receive millimeter waves, as described with reference to FIG. 3. In other examples (e.g., in an LTE system) the hardware components may be streamlined to receive radio frequency waves (e.g., may include a single antenna element and may not include phase shifters, intermediate frequencies, etc.). There are numerous architectures for antenna element selection and implementing phase shifting, only one example of which is illustrated here. The architecture 300 includes a modulator/demodulator (modem) 302, a digital-to-analog converter (DAC) 304, a first mixer 306, a second mixer 308, and a splitter 310. The architecture 300 also includes a plurality of first amplifiers 312, a plurality of phase shifters 314, a plurality of second amplifiers 316, and an antenna array 318 that includes a plurality of antenna elements 320. Transmission lines or other waveguides, wires, traces, or the like are shown connecting the various components to illustrate how signals to be transmitted may travel between components. Boxes 322, 324, 326, and 328 indicate regions in the architecture 300 in which different types of signals travel or are processed. Specifically, the box 322 indicates a region in which digital baseband signals travel or are processed, the box 324 indicates a region in which analog baseband signals travel or are processed, the box 326 indicates a region in which analog intermediate frequency (IF) signals travel or are processed, and the box 328 indicates a region in which analog radio frequency (RF) signals travel or are processed. The architecture also includes a local oscillator A 330, a local oscillator B 332, and a communications manager 334. In some examples, the communications manager 334 may be part of (e.g., may be an aspect of) modem 302.

Each of the antenna elements 320 may include one or more sub-elements (not shown) for radiating or receiving RF signals. For example, a single antenna element 320 may include a first sub-element cross-polarized with a second sub-element that can be used to independently transmit cross-polarized signals. The antenna elements 320 may include patch antennas or other types of antennas arranged in a linear, two dimensional, or other pattern. A spacing between antenna elements 320 may be such that signals with a desired wavelength transmitted separately by the antenna elements 320 may interact or interfere (e.g., to form a desired beam). For example, given an expected range of wavelengths or frequencies, the spacing may provide a quarter wavelength, half wavelength, or other fraction of a wavelength of spacing between neighboring antenna elements 320 to allow for interaction or interference of signals transmitted by the separate antenna elements 320 within that expected range.

The modem 302 processes and generates digital baseband signals and may also control operation of the DAC 304, the first and second mixers 306, 308, the splitter 310, the first amplifiers 312, the phase shifters 314, and/or the second amplifiers 316 to transmit signals via one or more or all of the antenna elements 320. The modem 302 may process signals and control operation in accordance with a communication standard such as a wireless standard discussed herein. The DAC 304 may convert digital baseband signals received from the modem 302 (and that are to be transmitted) into analog baseband signals. The first mixer 306 upconverts analog baseband signals to analog IF signals within an IF using a local oscillator 330. For example, the first mixer 306 may mix the signals with an oscillating signal generated by the local oscillator A 330 to "move" the baseband analog signals to the IF. In some cases, some processing or filtering (not shown) may take place at the IF. The second mixer 308 upconverts the analog IF signals to analog RF signals using the local oscillator B 332. Similarly to the first mixer, the second mixer 308 may mix the signals with an oscillating signal generated by the local oscillator B 332 to "move" the IF analog signals to the RF, or the frequency at which signals will be transmitted or received. The modem 302 may adjust the frequency of local oscillator A 330 and/or the local oscillator B 332 so that a desired IF and/or RF frequency is produced and used to facilitate processing and transmission of a signal within a desired bandwidth.

In the illustrated architecture 300, signals upconverted by the second mixer 308 are split or duplicated into multiple signals by the splitter 310. The splitter 310 in architecture 300 splits the RF signal into a plurality of identical or nearly identical RF signals, as denoted by its presence in box 328. In other examples, the split may take place with any type of signal including baseband digital, baseband analog, or IF analog signals. Each of these signals may correspond to an antenna element 320 and the signal travels through and is processed by the first amplifier 312, the second amplifier 316, phase shifters 314, and/or other elements corresponding to the respective antenna element 320 to be provided to and transmitted by the corresponding antenna element 320 of the antenna array 318. In one example, the splitter 310 may be an active splitter that is connected to a power supply and provides some gain so that RF signals exiting the splitter 310 are at a power level equal to or greater than the signal entering the splitter 310. In another example, the splitter 310 is a passive splitter that is not connected to power supply and the RF signals exiting the splitter 310 may be at a power level lower than the RF signal entering the splitter 310.

After being split by the splitter 310, the resulting RF signals may enter an amplifier, such as a first amplifier 312, or a phase shifter 314 corresponding to an antenna element 320. The first amplifier 312 and the second amplifier 316 are illustrated with dashed lines because one or both of them might not be necessary in some implementations. In one implementation, both the first amplifier 312 and second amplifier 316 are present. In another, neither the first amplifier 312 nor the second amplifier 316 are present. In other implementations, one of the first amplifier 312 and the second amplifier 316 is present but not the other. By way of example, if the splitter 310 is an active splitter, the first amplifier 312 may not be used. By way of further example, if the phase shifter 314 is an active phase shifter that can provide a gain, the second amplifier 316 might not be used. The first amplifier 312 and the second amplifier 316 may provide a desired level of positive or negative gain. A positive gain (positive dB) may be used to increase an amplitude of a signal for radiation by a specific antenna element 320. A negative gain (negative dB) may be used to decrease an amplitude and/or suppress radiation of the signal by a specific antenna element. Each of the first amplifier 312 and the second amplifier 316 may be controlled independently (e.g., by the modem 302 and/or the communications manager 334) to provide independent control of the gain for each antenna element 320. For example, the modem 302 and/or the communications manager 334 may have at least one control line connected to each of the splitter 310, the first amplifier 312, phase shifters 314, and/or the second amplifier 316 which may be used to configure a gain to provide a desired amount of gain for each component and thus each antenna element 320.

The phase shifter 314 may provide a configurable phase shift or phase offset to a corresponding RF signal to be transmitted. The phase shifter 314 could be a passive phase shifter not directly connected to a power supply. Passive phase shifters might introduce some insertion loss. The second amplifier 316 could boost the signal to compensate for the insertion loss. The phase shifter 314 could be an active phase shifter connected to a power supply such that the active phase shifter provides some amount of gain or prevents insertion loss. The settings of each of the phase shifters 314 are independent meaning that each can be set to provide a desired amount of phase shift or the same amount of phase shift or some other configuration. The modem 302 and/or the communications manager 334 may have at least one control line connected to each of the phase shifters 314 and which may be used to configure the phase shifters 314 to provide a desired amounts of phase shift or phase offset between antenna elements 320.

In the illustrated architecture 300, RF signals received by the antenna elements 320 are provided to one or more of first amplifier 356 to boost the signal strength. The first amplifier 356 may be connected to the same antenna arrays 318, e.g., for TDD operations. The first amplifier 356 may be connected to different antenna arrays 318. The boosted RF signal is input into one or more of phase shifter 354 to provide a configurable phase shift or phase offset for the corresponding received RF signal. The phase shifter 354 may be an active phase shifter or a passive phase shifter. The settings of the phase shifters 354 are independent, meaning that each can be set to provide a desired amount of phase shift or the same amount of phase shift or some other configuration. The modem 302 and/or the communications manager 334 may have at least one control line connected to each of the phase shifters 354 and which may be used to configure the phase shifters 354 to provide a desired amount of phase shift or phase offset between antenna elements 320.

The outputs of the phase shifters 354 may be input to one or more second amplifiers 352 for signal amplification of the phase shifted received RF signals. The second amplifiers 352 may be individually configured to provide a configured amount of gain. The second amplifiers 352 may be individually configured to provide an amount of gain to ensure that the signal input to combiner 350 have the same magnitude. The second amplifiers 352 and/or first amplifiers 356 are illustrated in dashed lines because they might not be necessary in some implementations. In one implementation, both the second amplifier 352 and the first amplifier 356 are present. In another, neither the second amplifier 352 nor the first amplifier 356 are present. In other implementations, one of the second amplifiers 352, first amplifier 356 is present but not the other.

In the illustrated architecture 300, signals output by the phase shifters 354 (via the second amplifiers 352 when present) are combined in combiner 350. The combiner 350 in architecture combines the RF signal into a signal, as denoted by its presence in box 328. The combiner 350 may be a passive combiner, e.g., not connected to a power source, which may result in some insertion loss. The combiner 350 may be an active combiner, e.g., connected to a power source, which may result in some signal gain. When the combiner 350 is an active combiner, it may provide a different (e.g., configurable) amount of gain for each input signal so that the input signals have the same magnitude when they are combined. When the combiner 350 is an active combiner, it may not need the second amplifier 352 (e.g., because the active combiner may provide the signal amplification).

The output of the combiner 350 is input into mixers (first mixer 348 and second mixer 346). The first mixer 348 and the second mixer 346 down convert the received RF signal using inputs from local oscillator 372 and local oscillator 370, respectively, to create intermediate or baseband signals that carry the encoded and modulated information. The output of the first mixer 348 and the second mixer 346 are input into an analog-to-digital converter (ADC) 344 for conversion to analog signals. The analog signals output from ADC 344 are input to modem 302 for baseband processing, e.g., decoding, de-interleaving, etc.

The architecture 300 is given by way of example to illustrate an architecture for transmitting and/or receiving signals. It is to be understood that the architecture 300 and/or each portion of the architecture 300 may be repeated multiple times within an architecture to accommodate or provide an arbitrary number of RF chains, antenna elements, and/or antenna panels. Further, numerous alternate architectures are possible and contemplated. For example, although only a single antenna array 318 is shown, two, three, or more antenna arrays may be included each with one or more of their own corresponding amplifiers, phase shifters, splitters, mixers, DACs, ADCs, and/or modems. For example, a single UE may include two, four or more antenna arrays for transmitting or receiving signals at different physical locations on the UE or in different directions. Further, mixers, splitters, amplifiers, phase shifters and other components may be located in different signal type areas (e.g., different ones of the boxes 322, 324, 326, 328) in different implemented architectures. For example, a split of the signal to be transmitted into a plurality of signals may take place at the analog RF, analog IF, analog baseband, or digital baseband frequencies in different examples. Similarly, amplification and/or phase shifts may also take place at different frequencies. For example, in some contemplated implementations, one or more of the splitter 310, the first amplifier 312, the second amplifier 316, or phase shifters 314 may be located between the DAC 304 and the first mixer 306 or between the first mixer 306 and the second mixer 308. In one example, the functions of one or more of the components may be combined into one component. For example, the phase shifters 314 may perform amplification to include or replace the first amplifier 312 and/or the second amplifier 316. By way of another example, a phase shift may be implemented by the second mixer 308 to obviate the need for a separate phase shifter 314. This technique is sometimes called local oscillator (LO) phase shifting. In one implementation of this configuration, there may be a plurality of IF to RF mixers (e.g., for each antenna element chain) within the second mixer 308 and the local oscillator B 332 would supply different local oscillator signals (with different phase offsets) to each IF to RF mixer.

The modem 302 and/or the communications manager 334 may control one or more of the other components 304 through 372 to select one or more antenna elements 320 and/or to form beams for transmission of one or more signals. For example, the antenna elements 320 may be individually selected or deselected for transmission of a signal (or signals) by controlling an amplitude of one or more corresponding amplifiers, such as the first amplifier 312 and/or the second amplifier 316. Beamforming includes generation of a beam using a plurality of signals on different antenna elements where one or more or all of the plurality signals are shifted in phase relative to each other. The formed beam may carry physical or higher layer reference signals or information. As each signal of the plurality of signals is radiated from a respective antenna element 320, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 318) can be dynamically controlled by modifying the phase shifts or phase offsets imparted by the phase shifters 314 and amplitudes imparted by the first amplifier 312, the second amplifier 316 of the plurality of signals relative to each other.

In some examples, a UE 115 may receive a reference signal. The reference signal may be passed through one or more first amplifiers 356 to amplify the reference signal, one or more receive phase shifters 354 to align the phase of one or more reference signals received across the multiple antenna elements 320, and one or more second amplifiers 352. The combiner 350 may combine signals received at various antenna elements 320 to generate the complete and aligned reference signal, and may pass the reference signal to the first mixer 348 and the second mixer 346. The first mixer 348 and the second mixer 346 may down convert the received reference signal using inputs from local oscillator 372 and local oscillator 370, respectively, to create intermediate or baseband signals that carry encoded and modulated data of the reference signal. The UE 115 may input the output of the first mixer 348 and the second mixer 346 into ADC 344 for conversion to digital signals. The digital signals output from ADC 344 are input to modem 302 for baseband processing, e.g., decoding, de-interleaving, etc. The decoded digital signal may then be forwarded to a processor for additional processing.

In some examples (e.g., in a long-term evolution (LTE) system) a UE 115 may receive signals using a single receive chain. That is, the UE 115 may receive a signal (e.g., a reference signal) at a single antenna element 320, and pass the signal through a first amplifier 356. No receive phase shifter 354 and no combiner 350 may be necessary in such examples (e.g., because the signal was received at a single antenna element 320). Similarly, the UE 115 may not pass the received signal through both a first mixer 348 and a second mixer 346 (e.g., because a signal in an LTE system may not be an mmW signal, and therefore may not need to be mixed to an intermediate signal and then to a baseband signal). Having passed the signal through a single filter, the UE 115 may pass the mixed signal through the ADC 344, generating a digital baseband signal for the modem 302. Or, in such examples (e.g., in an LTE system), the UE 115 may transmit signals using a single transmit chain. That is, the UE 115 may generate a signal for transmission. Modem 302 may prepare a digital signal (e.g., a bitstream) for transmission, and may pass the digital signal through the DAC 304. The UE 115 may then pass the analog baseband signal through a first mixer 306. A single mixer (e.g., first mixer 306) may be sufficient to transmit the signal (e.g., because the signal is not a mm wave signal). The first mixer 306 may upconvert the baseband signal to an appropriate frequency. The UE 115 may not have need of a splitter 310 because it utilizes a single transmit chain. Similarly, the UE 115 may have no need of a transmit phase shifter 314 (because no phase alignment across multiple antenna elements 320 may be needed for a single transmission chain). The UE 115 may pass the signal to the first amplifier 312, and may transmit the signal using a single antenna element 320.

In some examples, a UE 115 (e.g., as described with reference to FIGS. 1 and 2) may perform channel estimation. For example, the UE 115 may be configured to know one or more transmission parameters for one or more reference signals transmitted by a base station 105. Transmission parameters for the reference signals may include phase, modulation, waveform, or the like. The UE 115 may receive a reference signal using one or more antenna elements 320. Because modem 302 may be aware of the transmission parameters of the reference signal, modem 302 may be able to determine any differences between the received reference signal and the configured transmission parameters. These differences may be identified as distortions occurring to OTA signals over the channel on which the reference signal was received. The UE 115 (e.g., via modem 302) may generate one or more corrections that can be used to address the identified distortion, resulting in improved reception of subsequent signals and successful processing of the received reference signal.

The communications manager 334 may perform (e.g., at modem 302) one or more operations on a signal (e.g., a channel estimation, a channel state information compression, a coding, a decoding, or a combination thereof). That is, modem 302 may extract relevant data from the reference signal (e.g., a subset of the total number of bits included in the baseband signal) and forward the relevant data on to a processor for further processing. However, communications manager 334 may perform its operation on the signal prior to data extraction by modem 302 or further processing by a processor. In some examples, the communications manager 334 may perform channel estimation. That is, the communications manager 334 may receive the reference signal in the modem 302, and may process the reference signal using the communications manager 334. The communications manager 334 may generate one or more outputs, which may indicate error correction to address distortions (e.g., sampling time, finding carrier frequency offset (CFO), phase correction, or the like) to OTA signals on the channel. In some examples, processing the signals using customized function blocks (e.g., instead of traditional algorithms), may result in improved channel estimation. In some examples, the gathered data may be provided to the base station 105, which may be used to update one or more customized function block parameters over time. Thus, the UE 115 may be trained over time to learn behaviors (e.g., learn patterns and channel conditions in environments, scenarios, etc.).

In some examples, (e.g., a highly mobile UE 115, a UE 115 that is located within a moving vehicle, etc.) channel conditions may rapidly change. Using customized function block to process a signal (such as perform channel estimation) as described herein may result in improved channel quality (e.g., even when channel conditions are not available or known in real-time), and improved throughput and user experience. To process such signals by the communications manager 334, the UE 115 and the base station 105 may communicate parameters, feedback information, and the like, as described in greater detail with reference to FIGS. 4 and 5.

Figure 4:
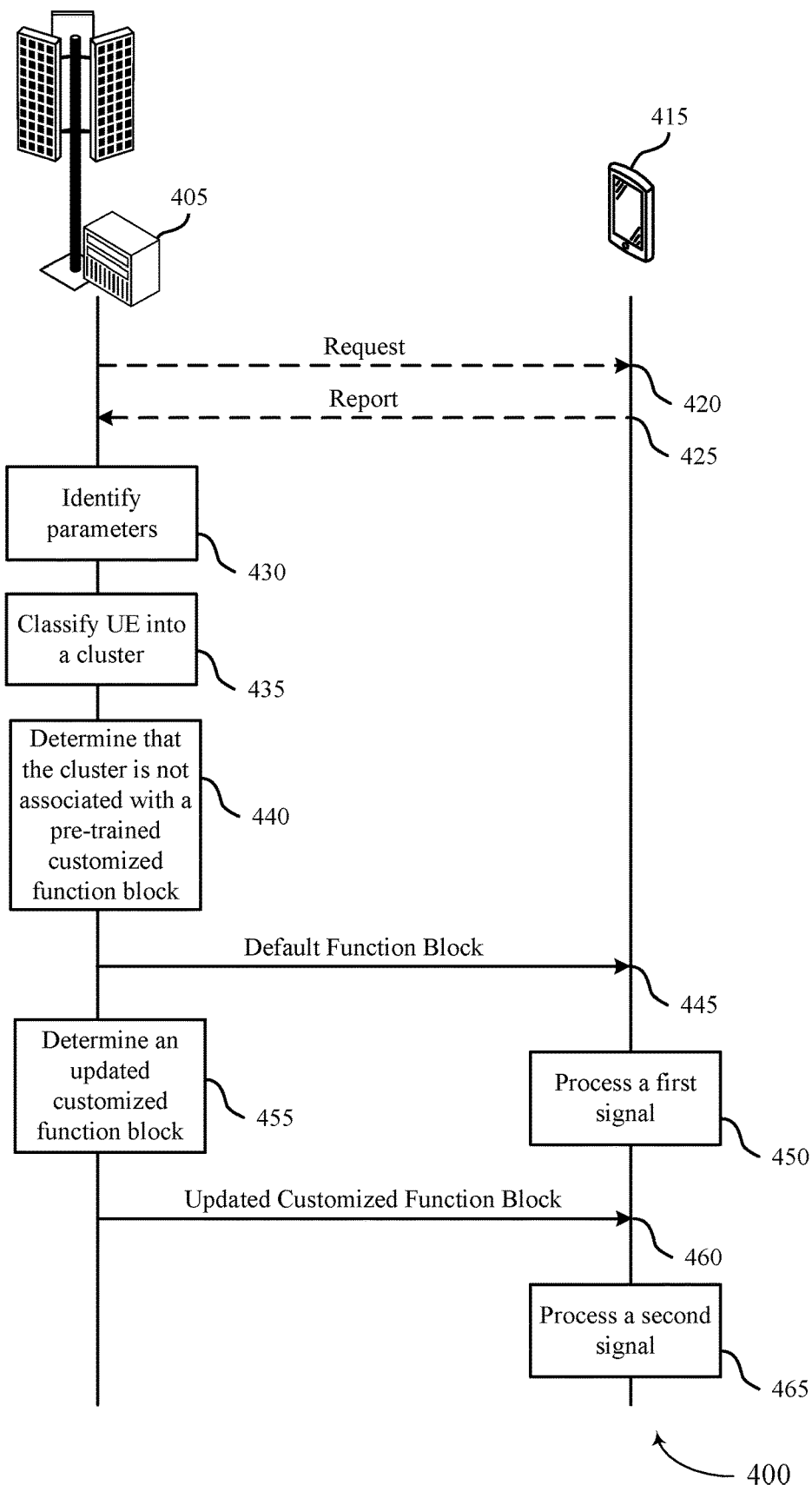
FIG. 4 illustrates an example of a process flow that supports customized function block sharing in wireless communications systems in accordance with various aspects of the present disclosure.

FIG. 4 illustrates an example of a process flow 400 that supports customized function block sharing in wireless communications systems in accordance with various aspects of the present disclosure. In some examples, the process flow 400 may implement aspects of the wireless communications system 100 and the wireless communications system 200 described with reference to FIGS. 1 and 2, respectively. For example, the process flow 400 may be based on a customized function block signaled from a base station 405 to a UE 415, for reduced power consumption and increased efficiency, and may promote low latency for wireless communications, among other benefits. The base station 405 and the UE 415 may be examples of a base station 105 and a UE 115, as described with reference to FIG. 1 and a base station 205 and a UE 215 (such as UE 215-a and UE 215-b), as described with reference to FIG. 2. In the following description of the process flow 400, the operations between the base station 405 and the UE 415 may be transmitted in a different order than the example order shown, or the operations performed by the base station 405 and the UE 415 may be performed in different orders or at different times. Some operations may also be omitted from the process flow 400, and other operations may be added to the process flow 400.

At 420, the base station 405 may optionally transmit, to the UE 415, a request for one or more parameters associated with the UE 415. In one example, the requested one or more parameters may include at least one of a location associated with the UE 415, a brand associated with the UE 415, a modem type associated with the UE 415, an antenna panel number associated with the UE 415, an antenna configuration associated with the UE 415, or a combination thereof. In some examples, the base station 405 may transmit the request via at least one of a DCI, an RRC signal, a MAC control element, or a combination thereof.

At 425, the UE 415 may optionally transmit, to the base station 405, a report indicating the requested parameter. In some examples, the UE 415 may transmit the report in response to receiving the request at 420. In some aspects, the UE 415 may measure the requested parameter associated with the UE 415 based on receiving the request (e.g., the request at 420). The UE 415 may then include the requested parameter in the report based on measuring the requested parameter associated with the UE 415. In some examples, the UE 415 may transmit the report via at least one of a MAC control element, an UCI, a PUSCH, or a combination thereof.

At 430, the base station 405 may identify the one or more parameters associated with the UE 415. In one example, the base station 405 may implicitly identify one or more parameters associated with the UE 415 (e.g., without transmitting a request). For example, the base station 405 may identify at least one of an estimated location associated with the UE 415, a trajectory associated with the UE 415, a motion behavior associated with the UE 415, a channel condition associated with the UE 415, or a combination thereof.

At 435, the base station 405 may classify the UE 415 into a cluster of UEs based on identifying the one or more parameters. For example, the base station 405 may classify the UE 415 based on information associated with the UE 415 (e.g., one or more parameters). In some cases, a cluster classifier may not be unique. Alternatively, the base station 405 may use a unique cluster classifier to classify the UE 415. In one example, the base station 405 may classify the UE 415 into a cluster of UEs based on at least one of a modem type associated with the UE 415, an antenna panel number associated with the UE 415, an antenna configuration associated with the UE 415, or a combination thereof.

At 440, the base station 405 may determine that cluster of UEs is not associated with a pre-trained customized function block. That is, the base station 405 may determine that the UE 415 is classified to one cluster where a pre-trained customized function block (or model) is not available for the UE 415.

At 445, the base station 405 may transmit a default function block to the UE 415. In one example, prior to transmitting the default function block, the base station 405 may determine the default function block based on determining that cluster of UEs is not associated with a pre-trained customized function block. At 450, the UE 415 may process a first signal at the UE 415 based on the received default function block.

At 455, the base station 405 may determine an updated customized function block based on the one or more parameters associated with the UE 415. For example, the base station 405 may perform training of a customized function block to determine the updated customized function block in real time. In some examples, the updated customized function block may include a function block customized using at least one of a neural network algorithm, an artificial intelligence algorithm, a reinforcement learning algorithm, or a combination thereof.

At 460, the base station 405 may transmit the updated customized function block to the UE 415. In some examples, the base station 405 may transmit the updated customized function block via at least one of a PDSCH, a RRC signal, a DCI, or a combination thereof. At 465, the UE 415 may process a second signal at the UE 415 based on the received customized function block.

The operations performed by the base station 405 and the UE 415 as part of, but not limited to, process flow 400 may provide improvements to wireless communications systems by customized function block sharing. Further, the operations performed by the base station 405 and the UE 415 as part of, but not limited to, process flow 400 may provide benefits and enhancements to the operation of the UE 415. For example, the described customized function block transmission operations in the process flow 400 may support reduced power consumption, increased efficiency, among other advantages.

Figure 5:
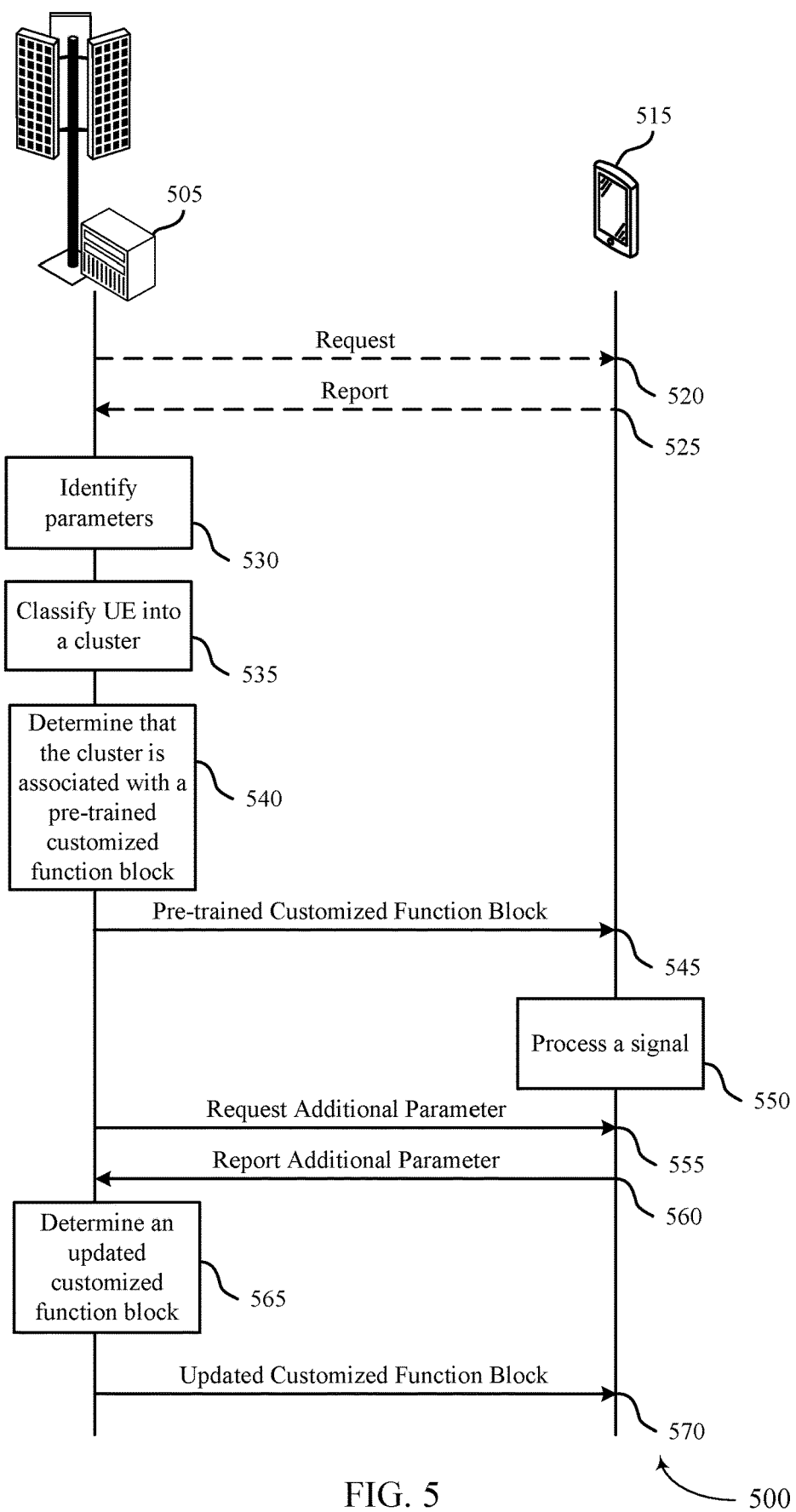
FIG. 5 illustrates an example of a process flow that supports customized function block sharing in wireless communications systems in accordance with various aspects of the present disclosure.

FIG. 5 illustrates an example of a process flow 500 that supports customized function block sharing in wireless communications systems in accordance with various aspects of the present disclosure. In some examples, the process flow 500 may implement aspects of the wireless communications system 100 and the wireless communications system 200 described with reference to FIGS. 1 and 2, respectively. For example, the process flow 500 may be based on a customized function block (e.g., a function block customized according to one or more parameters associated with a UE 515) signaled from a base station 505 to the UE 515, for increased efficiency, and may promote low latency for wireless communications, among other benefits. The base station 505 and the UE 515 may be examples of a base station 105 and a UE 115, as described with reference to FIG. 1 and a base station 205 and a UE 215 (such as UE 215-a and UE 215-b), as described with reference to FIG. 2. In the following description of the process flow 500, the operations between the base station 505 and the UE 515 may be transmitted in a different order than the example order shown, or the operations performed by the base station 505 and the UE 515 may be performed in different orders or at different times. Some operations may also be omitted from the process flow 500, and other operations may be added to the process flow 500.

At 520, the base station 505 may optionally transmit, to the UE 515, a request for one or more parameters associated with the UE 515. In one example, the requested one or more parameters may include at least one of a location associated with the UE 515, a brand associated with the UE 515, a modem type associated with the UE 515, an antenna panel number associated with the UE 515, an antenna configuration associated with the UE 515, or a combination thereof. In some examples, the base station 505 may transmit the request via at least one of a DCI, an RRC signal, a MAC control element, or a combination thereof.

At 525, in response to receiving the request from the base station 505, the UE 515 may optionally transmit, to the base station 505, a report indicating the requested parameter. In some examples, the UE 515 may measure the requested parameter associated with the UE 515 based on receiving the request (e.g., the request at 520), and may include the requested parameter in the report based on measuring the requested parameter. The UE 515 may transmit the report via at least one of a MAC control element, an UCI, a PUSCH, or a combination thereof.

At 530, the base station 505 may identify the one or more parameters associated with the UE 515 based on receiving the report. Alternatively, the base station 505 may implicitly identify one or more parameters associated with the UE 515 (e.g., without transmitting a request). As an implicit identification, the base station 505 may identify at least one of an estimated location associated with the UE 515, a trajectory associated with the UE 515, a motion behavior associated with the UE 515, a channel condition associated with the UE 515, or a combination thereof.

At 535, the base station 505 may classify the UE 515 into a cluster of UEs based on identifying the one or more parameters. At 540, the base station 505 may determine that the cluster of UEs is associated with a pre-trained customized function block. For instance, the base station 505 may determine that the UE 515 is classified to one cluster where a pre-trained customized function block (or model) is available for the UE 515. In some examples, the pre-trained customized function block may include a function block customized using at least one of a neural network algorithm, an artificial intelligence algorithm, a reinforcement learning algorithm, or a combination thereof.

At 545, the base station 505 may transmit a pre-trained customized function block (e.g., the pre-trained customized function block associated with the cluster of UEs) to the UE 515. At 550, the UE 515 may process a signal at the UE 515 based on the received customized function block.

At 555, the base station 505 may transmit a second request for an additional parameter associated with the UE 515. In some instances, the base station 505 may transmit the second request after transmitting the pre-trained customized function block. At 560, the UE 515 may transmit, to the base station, a second report indicating the additional parameter based on receiving the second request at 555. In one example, the additional parameter may include training data utilized by the base station 505 for future enhancement.

At 565, the base station 505 may determine an updated customized function block based on the additional parameter reported by the UE 515. At 570, the base station 505 may transmit the updated customized function block to the UE 515.

The operations performed by the base station 505 and the UE 515 as part of, but not limited to, process flow 500 may provide improvements to wireless communications systems by customized function block sharing. Further, the operations performed by the base station 505 and the UE 515 as part of, but not limited to, process flow 500 may provide benefits and enhancements to the operation of the UE 515.

Figure 6:
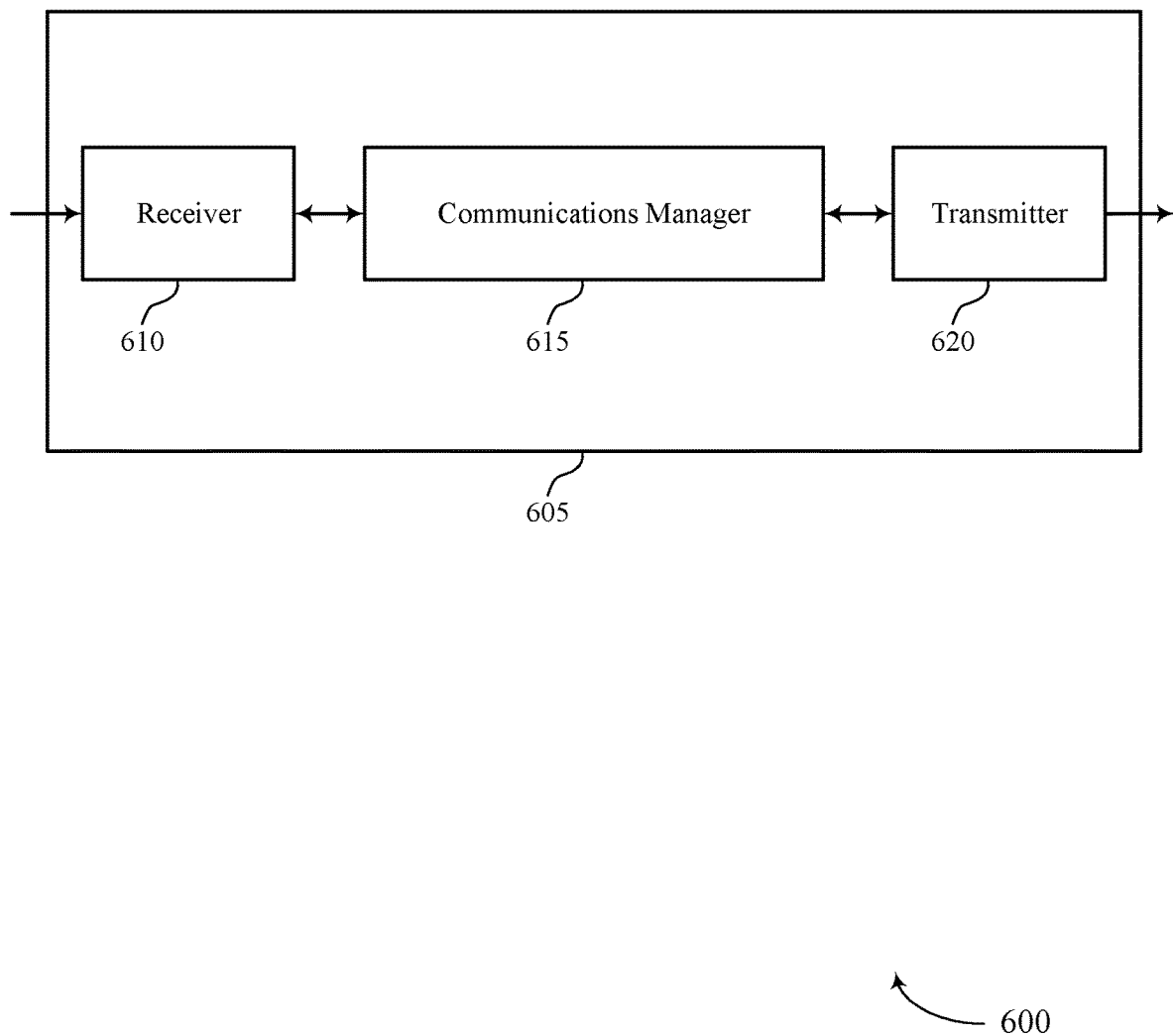
FIGS. 6 and 7 show block diagrams of devices that support customized function block sharing in wireless communications systems in accordance with various aspects of the present disclosure.

FIG. 6 shows a block diagram 600 of a device 605 that supports customized function block sharing in wireless communications systems in accordance with various aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to customized function block sharing in wireless communications systems, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a base station, a request for a parameter associated with the UE, transmit, to the base station, a report indicating the requested parameter in response to receiving the request, receive, from the base station, a customized function block based on the transmitting the report, and process a signal at the UE based on the received customized function block. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver component. For example, the transmitter 620 may be an example of aspects of the transceiver 920 described with reference to FIG. 9. The transmitter 620 may utilize a single antenna or a set of antennas.

Figure 7:
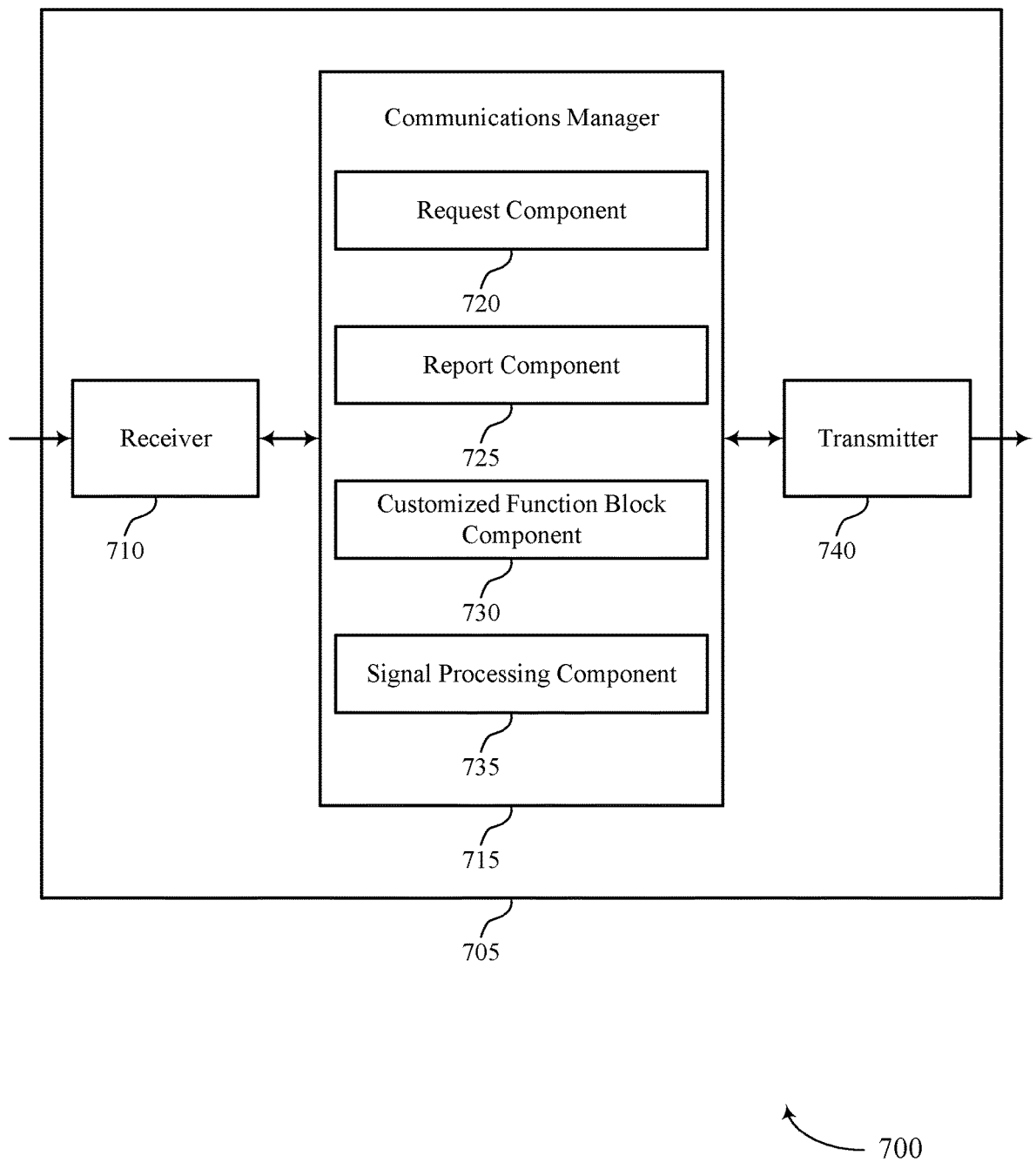

FIG. 7 shows a block diagram 700 of a device 705 that supports customized function block sharing in wireless communications systems in accordance with various aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to customized function block sharing in wireless communications systems, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a request component 720, a report component 725, a customized function block component 730, and a signal processing component 735. The communications manager 715 may be an example of aspects of the communications manager 910 described herein.

The request component 720 may receive, from a base station, a request for a parameter associated with the UE. The report component 725 may transmit, to the base station, a report indicating the requested parameter in response to receiving the request. The customized function block component 730 may receive, from the base station, a customized function block based on the transmitting the report. The signal processing component 735 may process a signal at the UE based on the received customized function block.

The transmitter 740 may transmit signals generated by other components of the device 705. In some examples, the transmitter 740 may be collocated with a receiver 710 in a transceiver component. For example, the transmitter 740 may be an example of aspects of the transceiver 920 described with reference to FIG. 9. The transmitter 740 may utilize a single antenna or a set of antennas.

Figure 8:
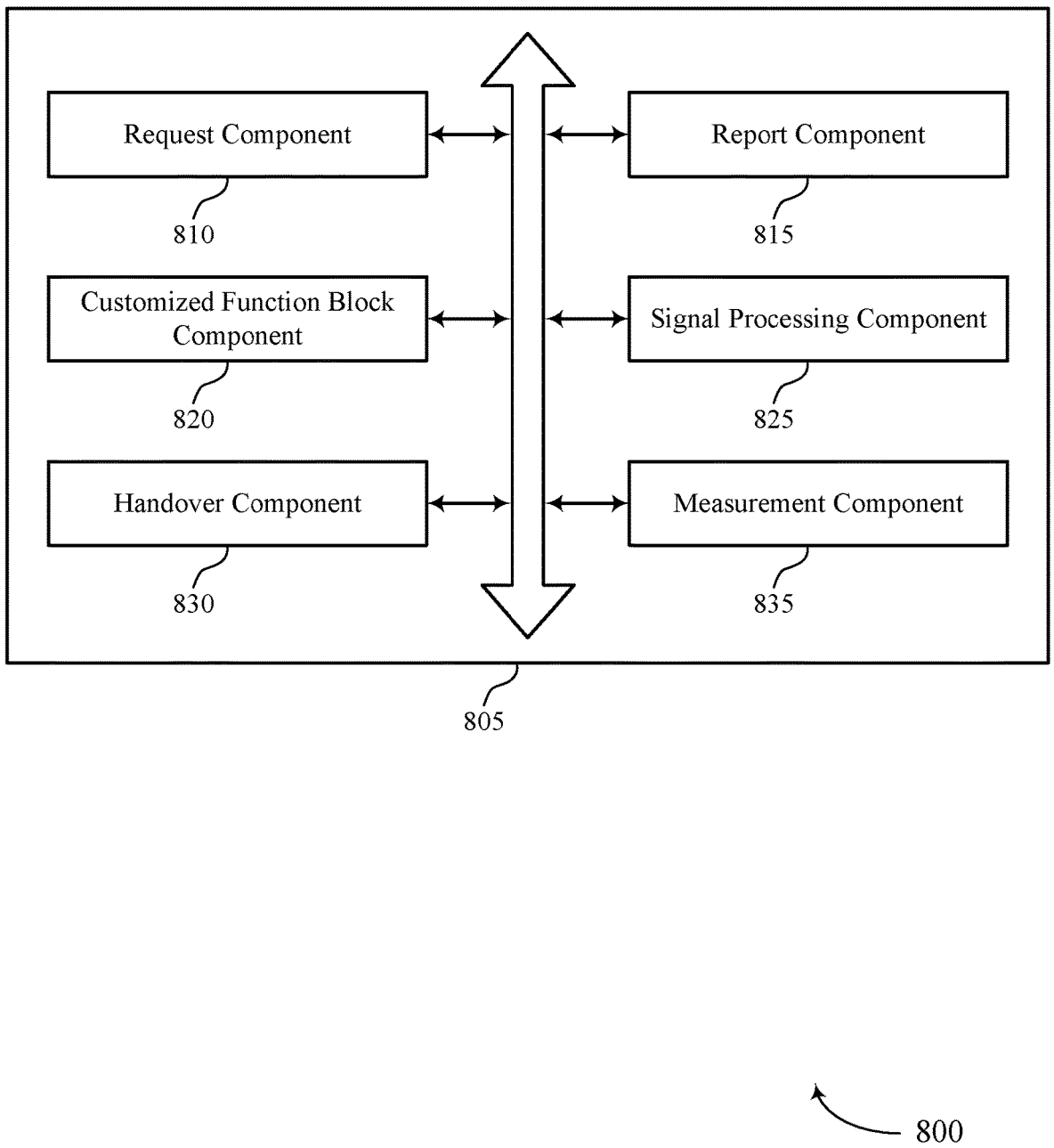
FIG. 8 shows a block diagram of a communications manager that supports customized function block sharing in wireless communications systems in accordance with various aspects of the present disclosure.

FIG. 8 shows a block diagram 800 of a communications manager 805 that supports customized function block sharing in wireless communications systems in accordance with various aspects of the present disclosure. The communications manager 805 may be an example of aspects of a communications manager 615, a communications manager 715, or a communications manager 910 described herein. The communications manager 805 may include a request component 810, a report component 815, a customized function block component 820, a signal processing component 825, a handover component 830, and a measurement component 835. Each of these components may communicate, directly or indirectly, with one another (e.g., via one or more buses).

The request component 810 may receive, from a base station, a request for a parameter associated with the UE. In some cases, the requested parameter includes at least one of a location associated with the UE, a brand associated with the UE, a modem type associated with the UE, an antenna panel number associated with the UE, an antenna configuration associated with the UE, or a combination thereof. In some examples, the request component 810 may receive the request via at least one of a DCI, an RRC signal, a MAC control element, or a combination thereof.

The report component 815 may transmit, to the base station, a report indicating the requested parameter in response to receiving the request. In some examples, the report component 815 may transmit the report indicating the requested parameter via at least one of a MAC control element, an UCI, a PUSCH, or a combination thereof.

The customized function block component 820 may receive, from the base station, a customized function block based on the transmitting the report. In some cases, the customized function block includes a pre-trained customized function block for a cluster of UEs associated with the requested parameter. In some cases, the customized function block includes a function block customized using at least one of a neural network algorithm, an artificial intelligence algorithm, a reinforcement learning algorithm, or a combination thereof. In some examples, the customized function block component 820 may receive the customized function block via at least one of a PDSCH, a RRC signal, a DCI, or a combination thereof. The signal processing component 825 may process a signal at the UE based on the received customized function block.

In some examples, the request component 810 may receive, from the base station and after receiving the customized function block, a second request for an additional parameter associated with the UE. In some examples, the report component 815 may transmit, to the base station, a second report indicating the additional parameter based on receiving the second request.

In some examples, the customized function block component 820 may receive, from the base station, an updated customized function block, where the updated customized function block is based on the additional parameter associated with the UE. In some examples, the signal processing component 825 may process a second signal at the UE based on the updated customized function block.

In some examples, the customized function block component 820 may receive, from the base station, an updated customized function block, where the updated customized function block is based on the requested parameter associated with the UE. In some examples, the signal processing component 825 may process a second signal at the UE based on the updated customized function block. In some cases, the customized function block includes a default function block.

The handover component 830 may receive, from the base station, a second request to perform a handover to a second base station. In some examples, the handover component 830 may perform the handover to the second base station in response to receiving the second request. In some examples, the customized function block component 820 may receive, from the second base station, the customized function block based on performing the handover. In some examples, the customized function block component 820 may receive, from the second base station, an updated customized function block based on performing the handover.

The measurement component 835 may measure the requested parameter associated with the UE based on receiving the request. In some examples, the report component 815 may include the requested parameter in the report based on the measuring. In some examples, the signal processing component 825 may perform, at the UE, an operation associated with the signal, the operation including at least one of a channel estimation, a channel state information compression, a coding, a decoding, or a combination thereof.

Figure 9:
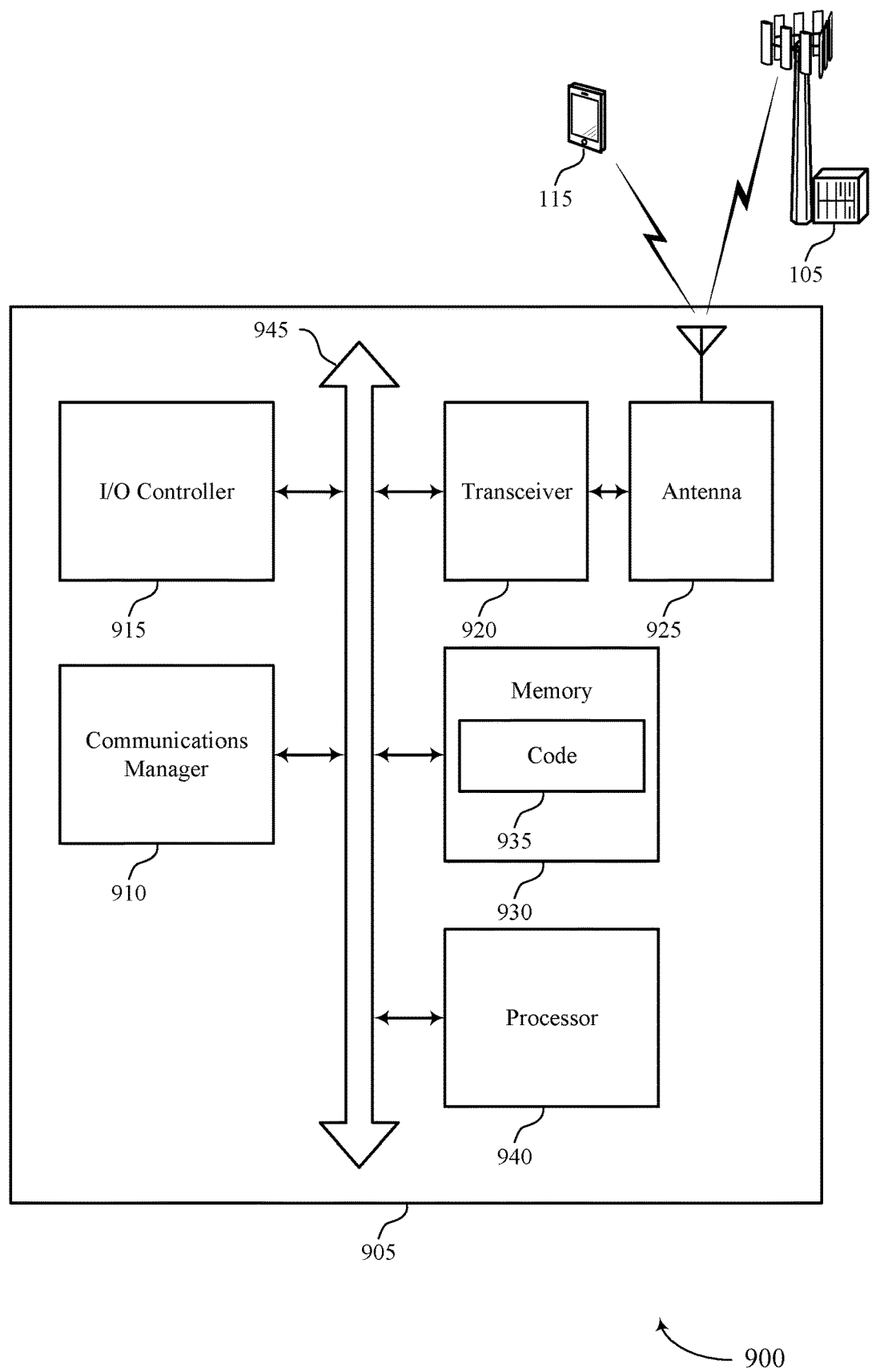
FIG. 9 shows a diagram of a system including a device that supports customized function block sharing in wireless communications systems in accordance with various aspects of the present disclosure.

FIG. 9 shows a diagram of a system 900 including a device 905 that supports customized function block sharing in wireless communications systems in accordance with various aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a base station, a request for a parameter associated with the UE, transmit, to the base station, a report indicating the requested parameter in response to receiving the request, receive, from the base station, a customized function block based on the transmitting the report, and process a signal at the UE based on the received customized function block.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting customized function block sharing in wireless communications systems).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
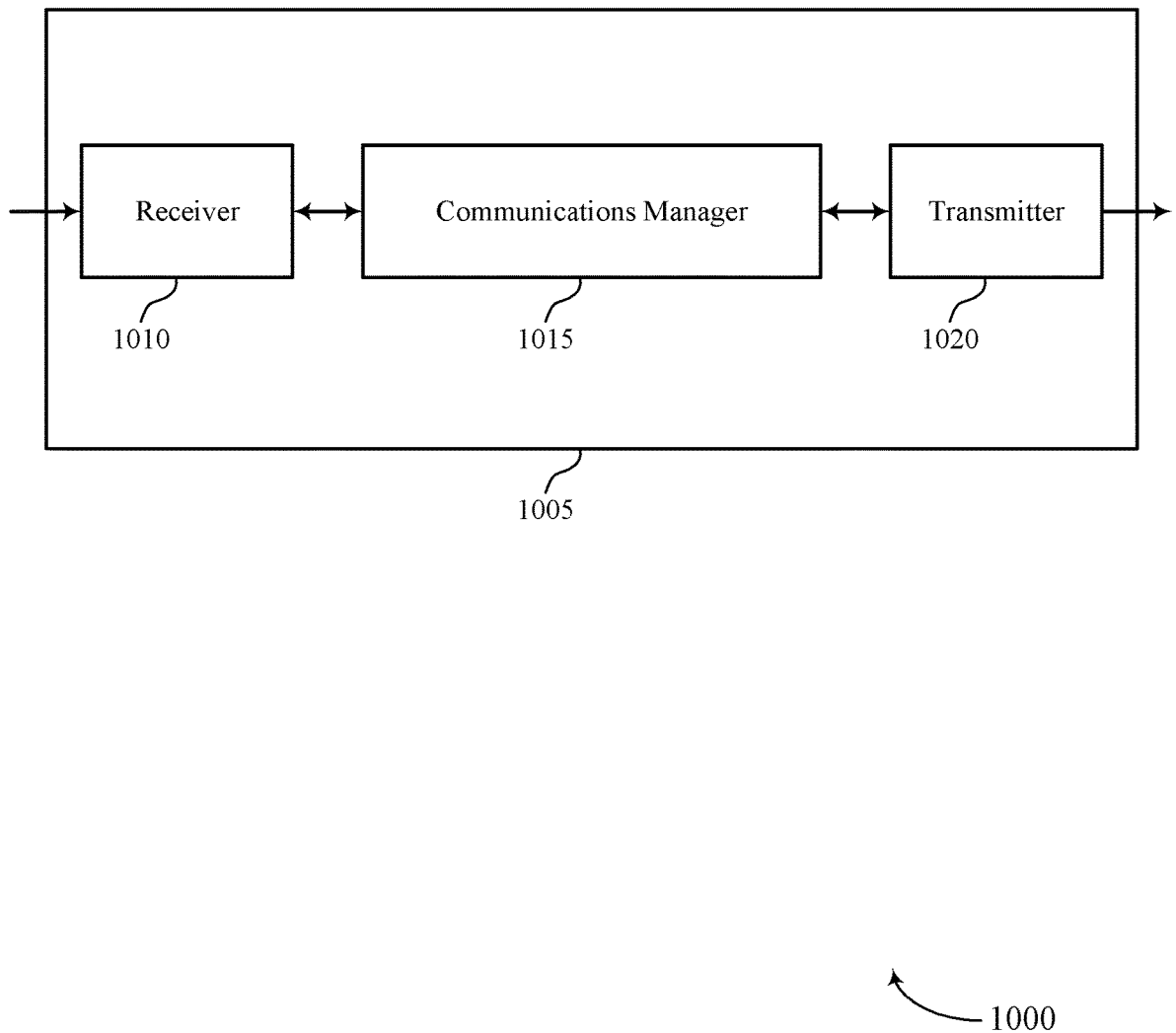
FIGS. 10 and 11 show block diagrams of devices that support customized function block sharing in wireless communications systems in accordance with various aspects of the present disclosure.

FIG. 10 shows a block diagram 1000 of a device 1005 that supports customized function block sharing in wireless communications systems in accordance with various aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to customized function block sharing in wireless communications systems, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify one or more parameters associated with a UE, classify the UE into a cluster of UEs based on identifying the one or more parameters, determine a customized function block based on classifying the UE into the cluster of UEs, and transmit, to the UE, the customized function block based on determining the customized function block. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver component. For example, the transmitter 1020 may be an example of aspects of the transceiver 1320 described with reference to FIG. 13. The transmitter 1020 may utilize a single antenna or a set of antennas.

Figure 11:
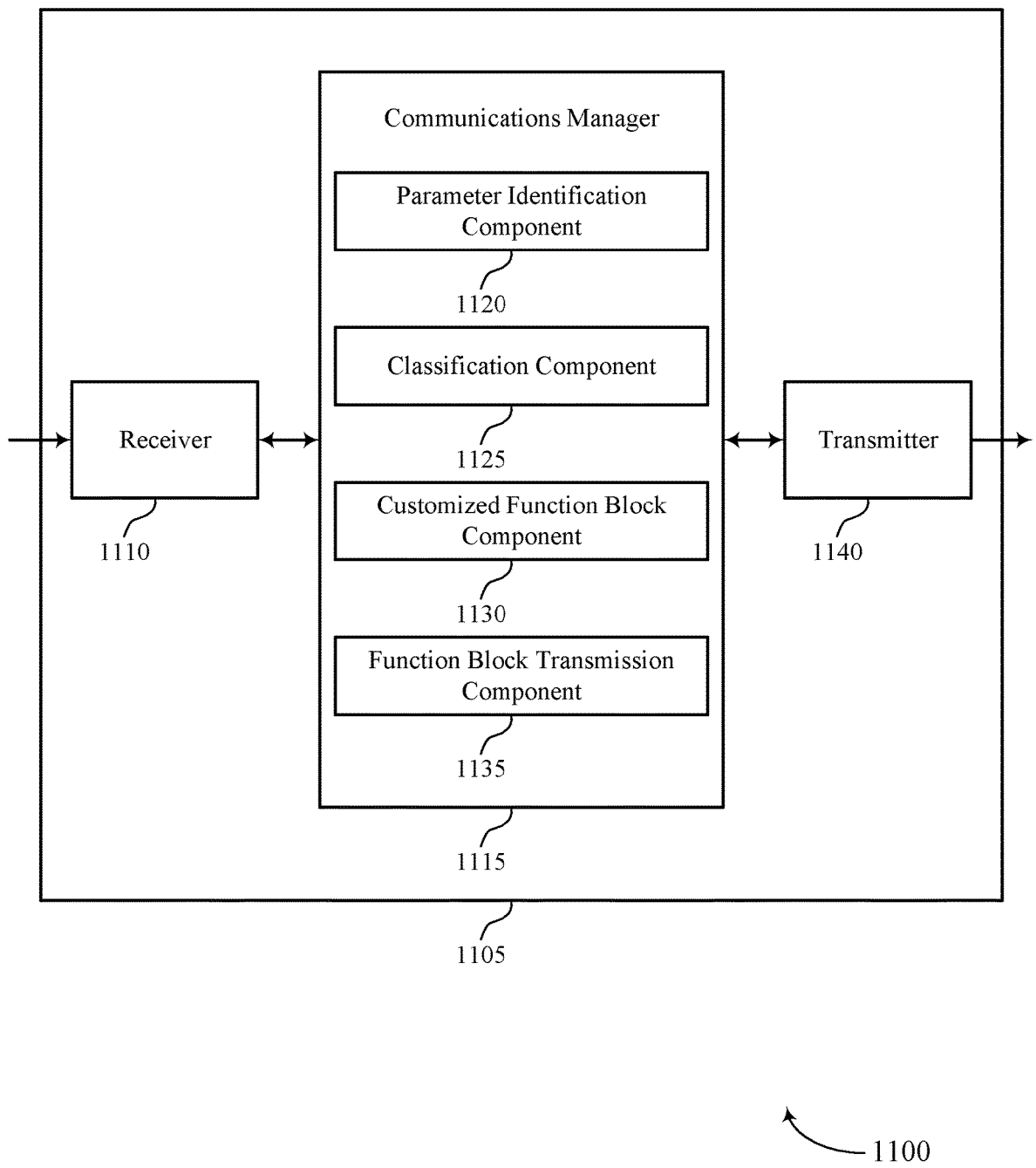

FIG. 11 shows a block diagram 1100 of a device 1105 that supports customized function block sharing in wireless communications systems in accordance with various aspects of the present disclosure. The device 1105 may be an example of aspects of a device 1005, or a base station 105 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to customized function block sharing in wireless communications systems, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a parameter identification component 1120, a classification component 1125, a customized function block component 1130, and a function block transmission component 1135. The communications manager 1115 may be an example of aspects of the communications manager 1310 described herein.

The parameter identification component 1120 may identify one or more parameters associated with a UE. The classification component 1125 may classify the UE into a cluster of UEs based on identifying the one or more parameters. The customized function block component 1130 may determine a customized function block based on classifying the UE into the cluster of UEs. The function block transmission component 1135 may transmit, to the UE, the customized function block based on determining the customized function block.

The transmitter 1140 may transmit signals generated by other components of the device 1105. In some examples, the transmitter 1140 may be collocated with a receiver 1110 in a transceiver component. For example, the transmitter 1140 may be an example of aspects of the transceiver 1320 described with reference to FIG. 13. The transmitter 1140 may utilize a single antenna or a set of antennas.

Figure 12:
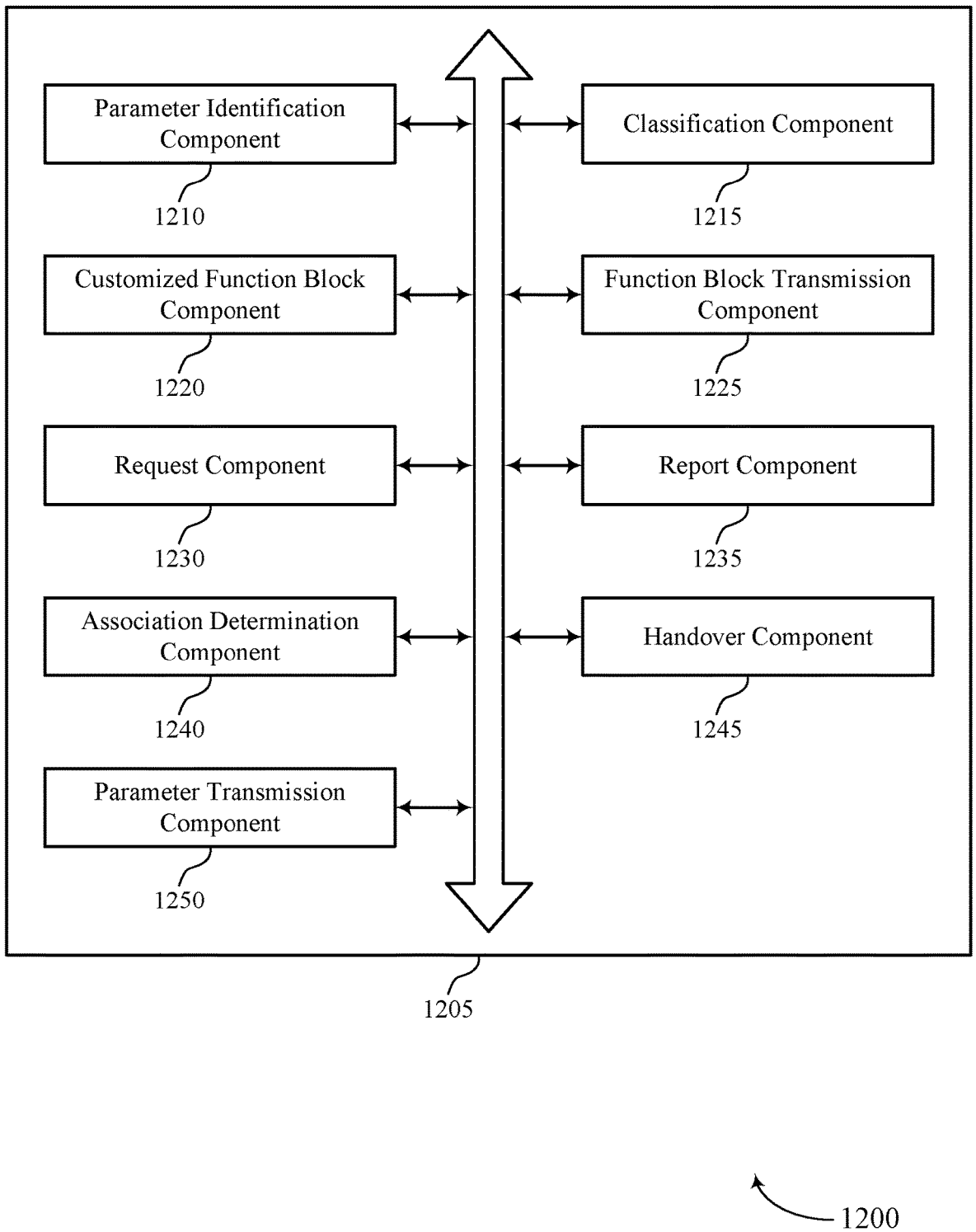
FIG. 12 shows a block diagram of a communications manager that supports customized function block sharing in wireless communications systems in accordance with various aspects of the present disclosure.

FIG. 12 shows a block diagram 1200 of a communications manager 1205 that supports customized function block sharing in wireless communications systems in accordance with various aspects of the present disclosure. The communications manager 1205 may be an example of aspects of a communications manager 1015, a communications manager 1115, or a communications manager 1310 described herein. The communications manager 1205 may include a parameter identification component 1210, a classification component 1215, a customized function block component 1220, a function block transmission component 1225, a request component 1230, a report component 1235, an association determination component 1240, a handover component 1245, and a parameter transmission component 1250. Each of these components may communicate, directly or indirectly, with one another (e.g., via one or more buses).

The parameter identification component 1210 may identify one or more parameters associated with a UE. The classification component 1215 may classify the UE into a cluster of UEs based on identifying the one or more parameters. The customized function block component 1220 may determine a customized function block based on classifying the UE into the cluster of UEs. The function block transmission component 1225 may transmit, to the UE, the customized function block based on determining the customized function block.

The association determination component 1240 may determine that the cluster of UEs is associated with a pre-trained customized function block, where the customized function block includes the pre-trained customized function block. The request component 1230 may transmit, to the UE and after transmitting the customized function block, a request for an additional parameter associated with the UE. The report component 1235 may receive, from the UE, a report indicating the additional parameter based on transmitting the request.

In some examples, the customized function block component 1220 may determine an updated customized function block based on receiving the additional parameter associated with the UE. In some examples, the function block transmission component 1225 may transmit, to the UE, the updated customized function block based on determining the updated customized function block.

In some examples, the association determination component 1240 may determine that the cluster of UEs is not associated with a pre-trained customized function block, where wherein transmitting the customized function block includes transmitting a default function block. In some examples, the customized function block component 1220 may determine an updated customized function block based on the one or more parameters associated with the UE. In some examples, the function block transmission component 1225 may transmit, to the UE, the updated customized function block based on determining the updated customized function block.

In some examples, the parameter identification component 1210 may identify the one or more parameters associated with a second UE. In some examples, the classification component 1215 may classify the second UE into the cluster of UEs based on identifying the one or more parameters. In some examples, the function block transmission component 1225 may transmit, to the second UE, the customized function block based on classifying the second UE into the cluster of UEs.

The handover component 1245 may transmit, to a second base station, a handover request to handover the UE from the base station to the second base station. In some examples, the handover component 1245 may receive, from the second base station, a handover response based on the handover request. In some examples, the function block transmission component 1225 may transmit, to the second base station and based on receiving the handover response, the customized function block. The parameter transmission component 1250 may transmit, to the second base station, the one or more parameters associated with the UE based on receiving the handover response.

In some examples, the function block transmission component 1225 may transmit, to the second base station, the customized function block via at least one of an Xn interface, a server, a component of a core network, or a combination thereof. In some examples, the parameter identification component 1210 may identify at least one of an estimated location associated with the UE, a trajectory associated with the UE, a motion behavior associated with the UE, a channel condition associated with the UE, or a combination thereof.

In some examples, the function block transmission component 1225 may transmit the customized function block via at least one of a PDSCH, an RRC signal, a DCI, or a combination thereof. In some cases, the customized function block includes a function block customized using at least one of a neural network algorithm, an artificial intelligence algorithm, a reinforcement learning algorithm, or a combination thereof.

In some examples, the request component 1230 may transmit, to the UE, a request for the one or more parameters associated with the UE. In some examples, the request component 1230 may transmit the request via at least one of a DCI, an RRC signal, a MAC control element, or a combination thereof. In some cases, the requested one or more parameters includes at least one of a location associated with the UE, a brand associated with the UE, a modem type associated with the UE, an antenna panel number associated with the UE, an antenna configuration associated with the UE, or a combination thereof. In some examples, the report component 1235 may receive, from the UE, a report indicating the requested one or more parameters, where classifying the UE into the cluster of UEs is based on the received one or more parameters.

Figure 13:
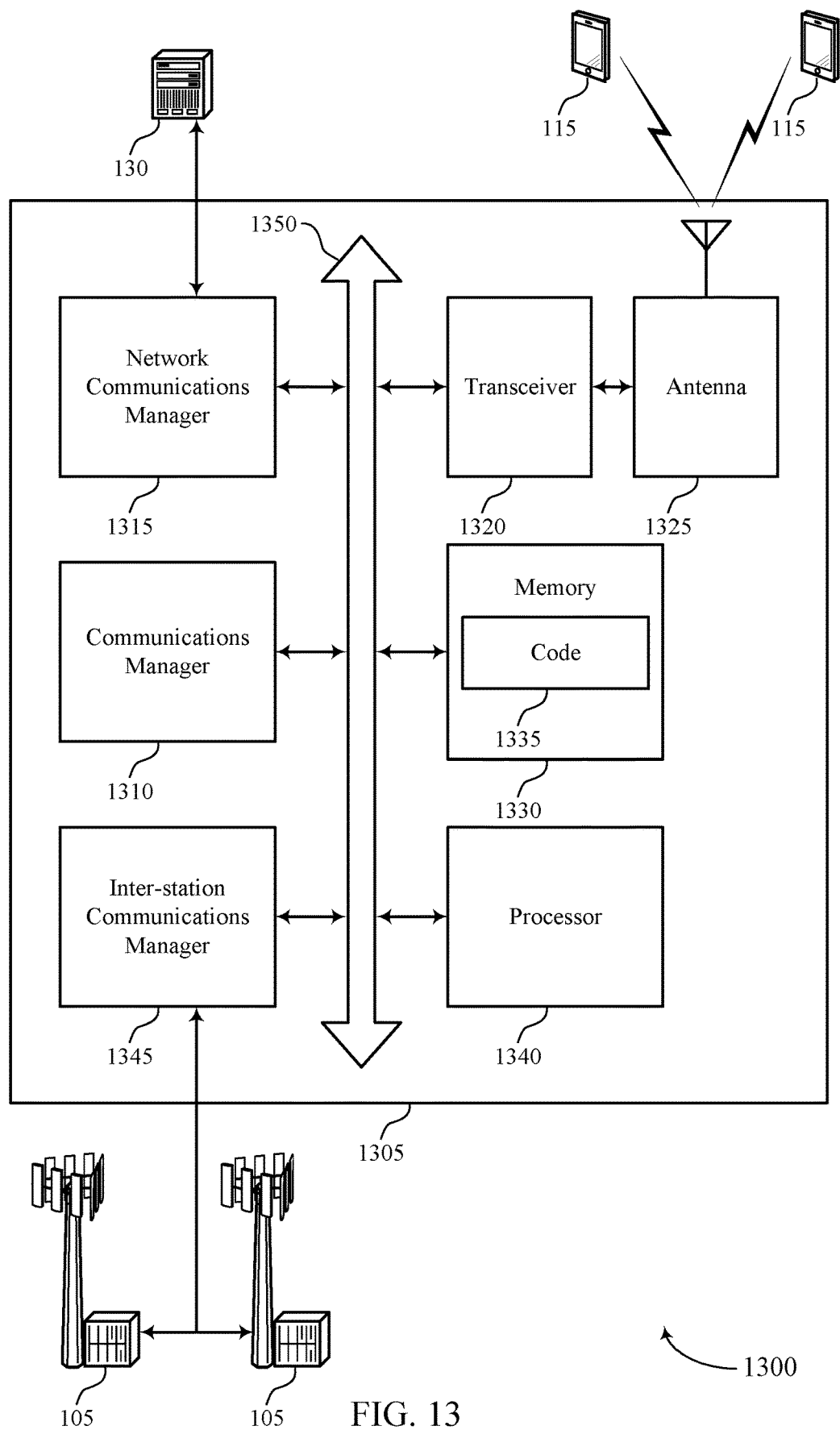
FIG. 13 shows a diagram of a system including a device that supports customized function block sharing in wireless communications systems in accordance with various aspects of the present disclosure.

FIG. 13 shows a diagram of a system 1300 including a device 1305 that supports customized function block sharing in wireless communications systems in accordance with various aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may identify one or more parameters associated with a UE, classify the UE into a cluster of UEs based on identifying the one or more parameters, determine a customized function block based on classifying the UE into the cluster of UEs, and transmit, to the UE, the customized function block based on determining the customized function block.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting customized function block sharing in wireless communications systems).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
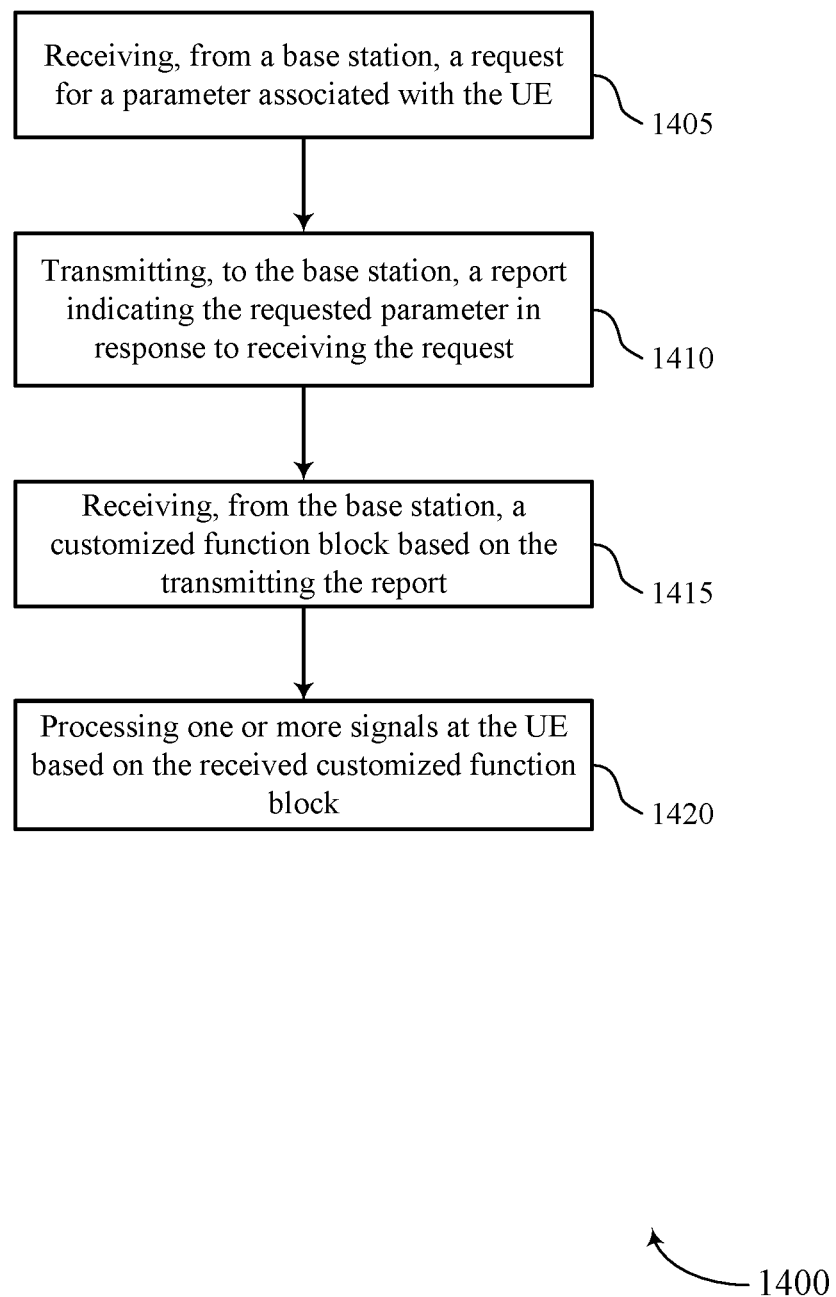
FIGS. 14 through 17 show flowcharts illustrating methods that support customized function block sharing in wireless communications systems in accordance with various aspects of the present disclosure.

FIG. 14 shows a flowchart illustrating a method 1400 that supports customized function block sharing in wireless communications systems in accordance with various aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the method 1400 may include receiving, from a base station, a request for a parameter associated with the UE. The operations of 1405 may be performed according to the methods described herein. In some examples, aspects of the operations of 1405 may be performed by a request component as described with reference to FIGS. 6 through 9.

At 1410, the method 1400 may include transmitting, to the base station, a report indicating the requested parameter in response to receiving the request. The operations of 1410 may be performed according to the methods described herein. In some examples, aspects of the operations of 1410 may be performed by a report component as described with reference to FIGS. 6 through 9.

At 1415, the method 1400 may include receiving, from the base station, a customized function block based on the transmitting the report. The operations of 1415 may be performed according to the methods described herein. In some examples, aspects of the operations of 1415 may be performed by a customized function block component as described with reference to FIGS. 6 through 9.

At 1420, the method 1400 may include processing one or more signals at the UE based on the received customized function block. The operations of 1420 may be performed according to the methods described herein. In some examples, aspects of the operations of 1420 may be performed by a signal processing component as described with reference to FIGS. 6 through 9.

Figure 15:
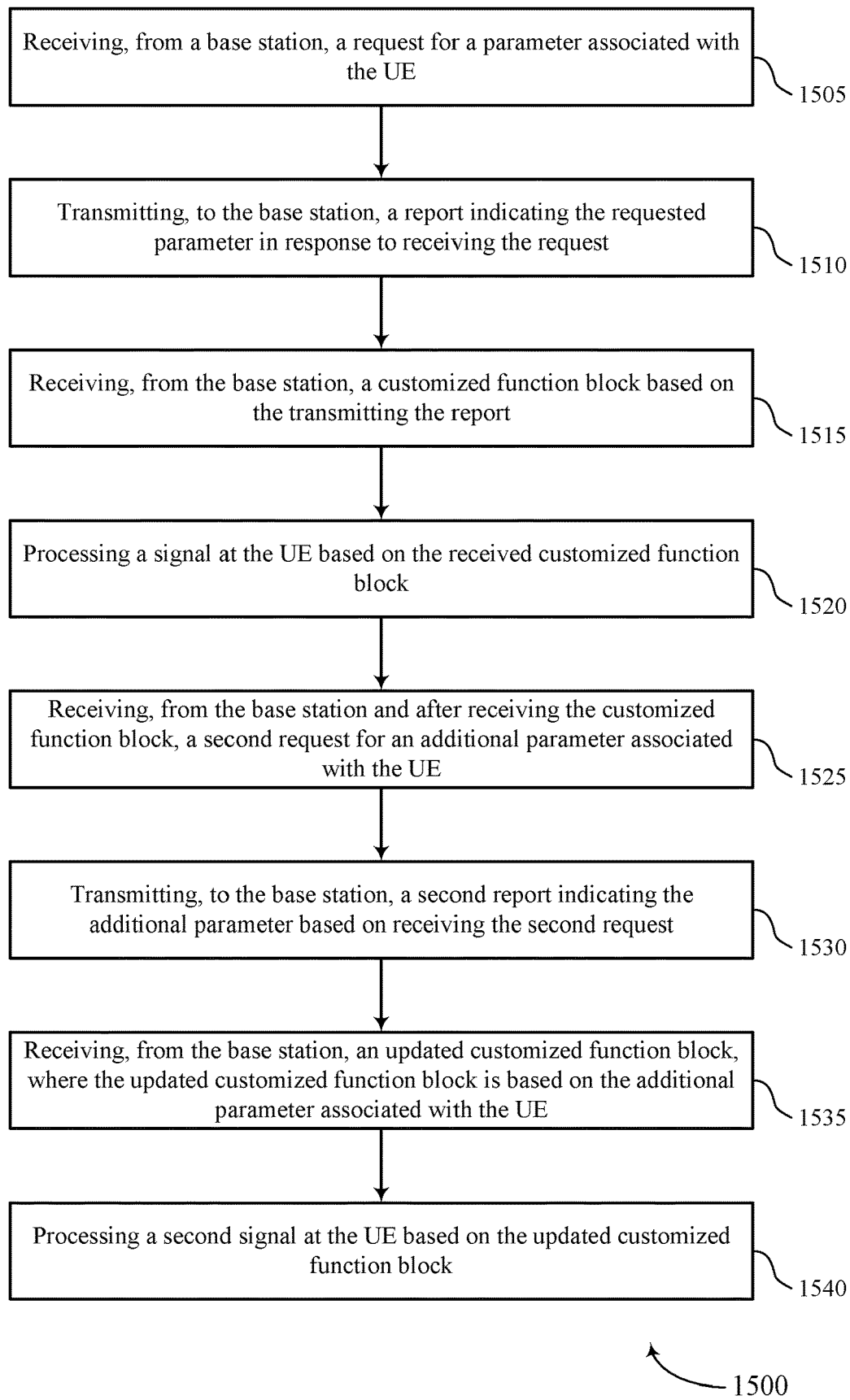

FIG. 15 shows a flowchart illustrating a method 1500 that supports customized function block sharing in wireless communications systems in accordance with various aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the method 1500 may include receiving, from a base station, a request for a parameter associated with the UE. The operations of 1505 may be performed according to the methods described herein. In some examples, aspects of the operations of 1505 may be performed by a request component as described with reference to FIGS. 6 through 9.

At 1510, the method 1500 may include transmitting, to the base station, a report indicating the requested parameter in response to receiving the request. The operations of 1510 may be performed according to the methods described herein. In some examples, aspects of the operations of 1510 may be performed by a report component as described with reference to FIGS. 6 through 9.

At 1515, the method 1500 may include receiving, from the base station, a customized function block based on the transmitting the report. The operations of 1515 may be performed according to the methods described herein. In some examples, aspects of the operations of 1515 may be performed by a customized function block component as described with reference to FIGS. 6 through 9.

At 1520, the method 1500 may include processing a signal at the UE based on the received customized function block. The operations of 1520 may be performed according to the methods described herein. In some examples, aspects of the operations of 1520 may be performed by a signal processing component as described with reference to FIGS. 6 through 9.

At 1525, the method 1500 may include receiving, from the base station and after receiving the customized function block, a second request for an additional parameter associated with the UE. The operations of 1525 may be performed according to the methods described herein. In some examples, aspects of the operations of 1525 may be performed by a request component as described with reference to FIGS. 6 through 9.

At 1530, the method 1500 may include transmitting, to the base station, a second report indicating the additional parameter based on receiving the second request. The operations of 1530 may be performed according to the methods described herein. In some examples, aspects of the operations of 1530 may be performed by a report component as described with reference to FIGS. 6 through 9.

At 1535, the method 1500 may include receiving, from the base station, an updated customized function block, where the updated customized function block is based on the additional parameter associated with the UE. The operations of 1535 may be performed according to the methods described herein. In some examples, aspects of the operations of 1535 may be performed by a customized function block component as described with reference to FIGS. 6 through 9.

At 1540, the method 1500 may include processing a second signal at the UE based on the updated customized function block. The operations of 1540 may be performed according to the methods described herein. In some examples, aspects of the operations of 1540 may be performed by a signal processing component as described with reference to FIGS. 6 through 9.

Figure 16:
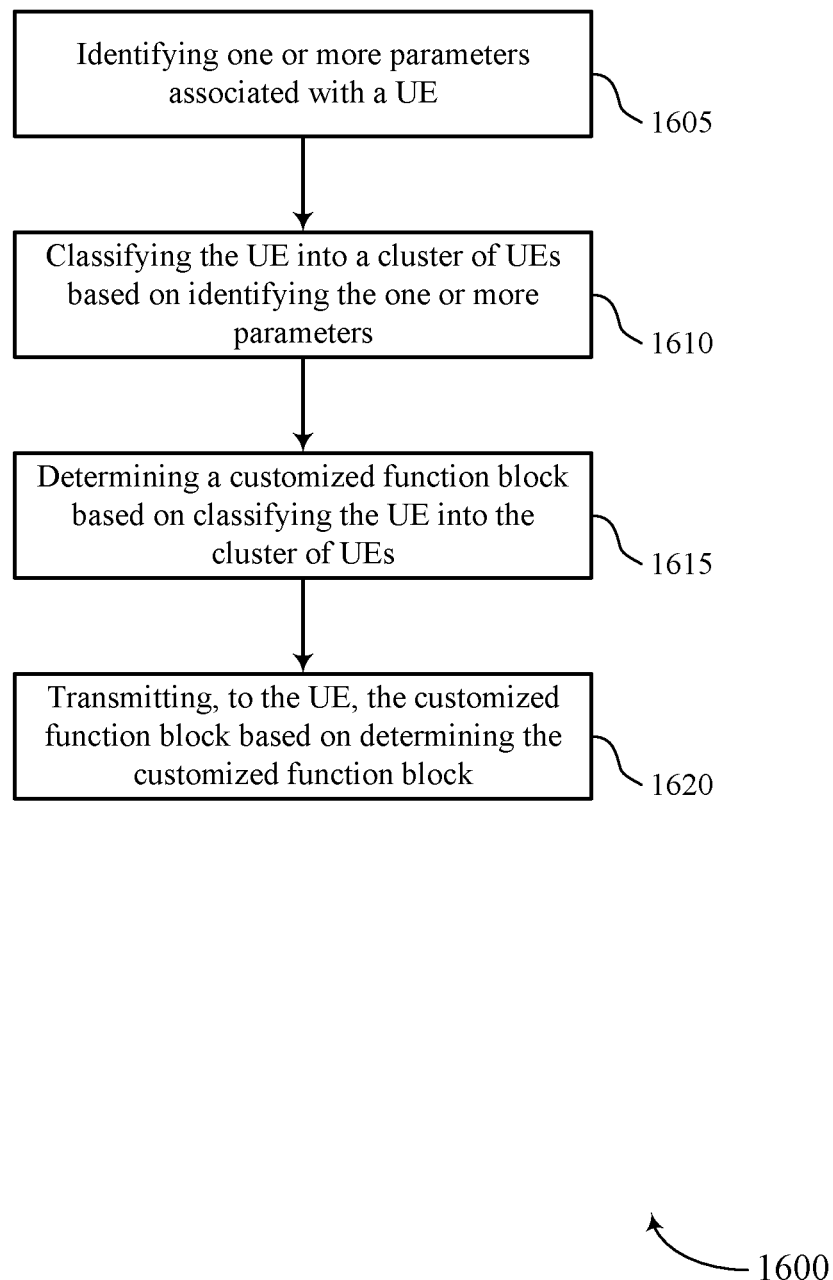

FIG. 16 shows a flowchart illustrating a method 1600 that supports customized function block sharing in wireless communications systems in accordance with various aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1605, the method 1600 may include identifying one or more parameters associated with a UE. The operations of 1605 may be performed according to the methods described herein. In some examples, aspects of the operations of 1605 may be performed by a parameter identification component as described with reference to FIGS. 10 through 13.

At 1610, the method 1600 may include classifying the UE into a cluster of UEs based on identifying the one or more parameters. The operations of 1610 may be performed according to the methods described herein. In some examples, aspects of the operations of 1610 may be performed by a classification component as described with reference to FIGS. 10 through 13.

At 1615, the method 1600 may include determining a customized function block based on classifying the UE into the cluster of UEs. The operations of 1615 may be performed according to the methods described herein. In some examples, aspects of the operations of 1615 may be performed by a customized function block component as described with reference to FIGS. 10 through 13.

At 1620, the method 1600 may include transmitting, to the UE, the customized function block based on determining the customized function block. The operations of 1620 may be performed according to the methods described herein. In some examples, aspects of the operations of 1620 may be performed by a function block transmission component as described with reference to FIGS. 10 through 13.

Figure 17:
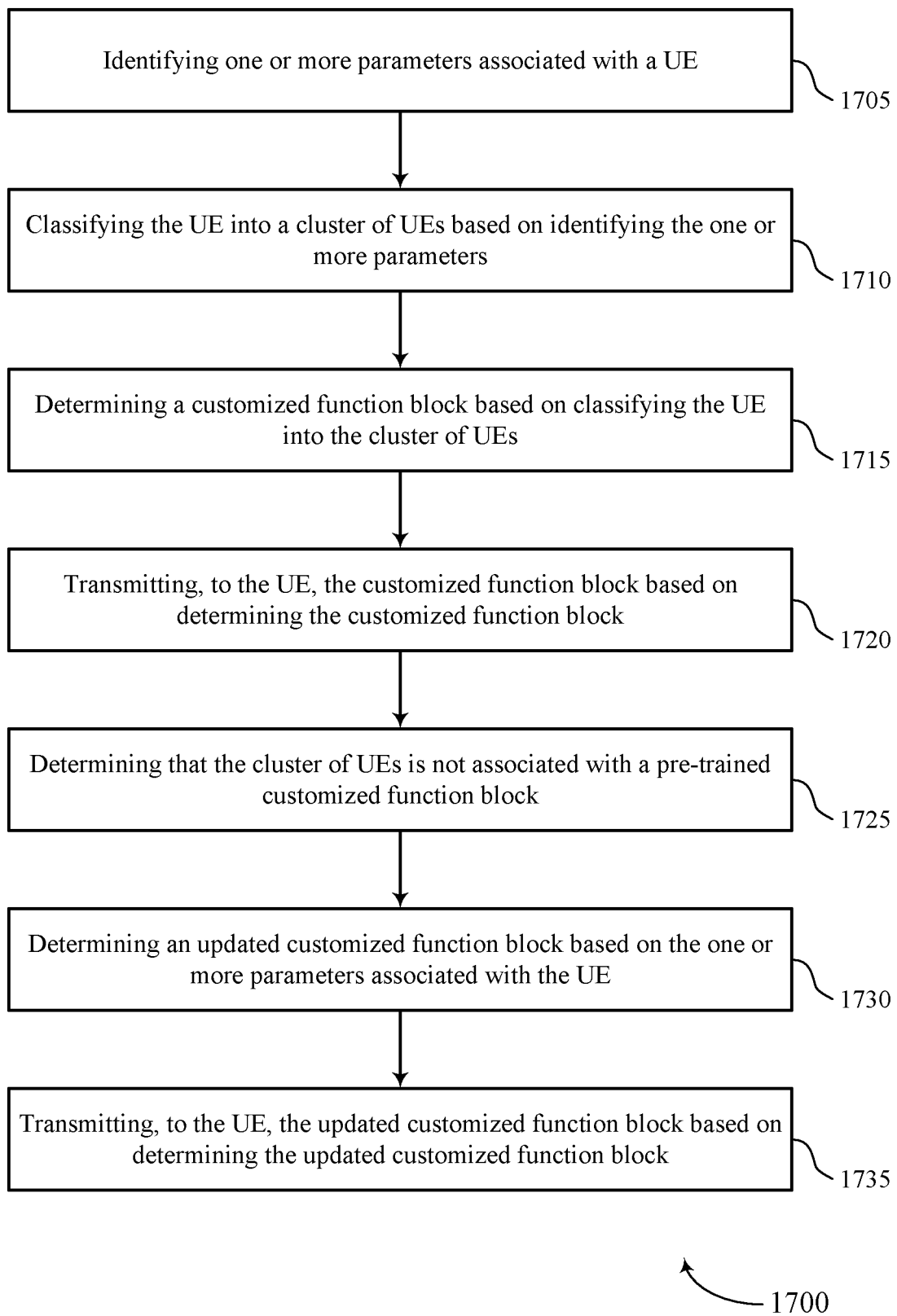

FIG. 17 shows a flowchart illustrating a method 1700 that supports customized function block sharing in wireless communications systems in accordance with various aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1705, the method 1700 may include identifying one or more parameters associated with a UE. The operations of 1705 may be performed according to the methods described herein. In some examples, aspects of the operations of 1705 may be performed by a parameter identification component as described with reference to FIGS. 10 through 13.

At 1710, the method 1700 may include classifying the UE into a cluster of UEs based on identifying the one or more parameters. The operations of 1710 may be performed according to the methods described herein. In some examples, aspects of the operations of 1710 may be performed by a classification component as described with reference to FIGS. 10 through 13.

At 1715, the method 1700 may include determining a customized function block based on classifying the UE into the cluster of UEs. The operations of 1715 may be performed according to the methods described herein. In some examples, aspects of the operations of 1715 may be performed by a customized function block component as described with reference to FIGS. 10 through 13.

At 1720, the method 1700 may include transmitting, to the UE, the customized function block based on determining the customized function block. The operations of 1720 may be performed according to the methods described herein. In some examples, aspects of the operations of 1720 may be performed by a function block transmission component as described with reference to FIGS. 10 through 13.

At 1725, the method 1700 may include determining that the cluster of UEs is not associated with a pre-trained customized function block. In some cases, transmitting the customized function block includes transmitting a default function block. The operations of 1725 may be performed according to the methods described herein. In some examples, aspects of the operations of 1725 may be performed by an association determination component as described with reference to FIGS. 10 through 13.

At 1730, the method 1700 may include determining an updated customized function block based on the one or more parameters associated with the UE. The operations of 1730 may be performed according to the methods described herein. In some examples, aspects of the operations of 1730 may be performed by a customized function block component as described with reference to FIGS. 10 through 13.

At 1735, the method 1700 may include transmitting, to the UE, the updated customized function block based on determining the updated customized function block. The operations of 1735 may be performed according to the methods described herein. In some examples, aspects of the operations of 1735 may be performed by a function block transmission component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: receiving, from a base station, a request for a parameter associated with the UE; transmitting, to the base station, a report indicating the requested parameter in response to receiving the request; receiving, from the base station, a customized function block based at least in part on the transmitting the report; and processing one or more signals at the UE based at least in part on the received customized function block.

Aspect 2: The method of aspect 1, wherein the UE is included in a cluster of UEs associated with the same customized function block, and further comprising: receiving, from the base station and after receiving the customized function block, a second request for an additional parameter associated with the UE; and transmitting, to the base station, a second report indicating the additional parameter based at least in part on receiving the second request.

Aspect 3: The method of aspect 2, further comprising: receiving, from the base station, an updated customized function block, wherein the updated customized function block is based at least in part on the additional parameter associated with the UE; and processing a second signal at the UE based at least in part on the updated customized function block.

Aspect 4: The method of any of aspects 1 through 3, further comprising: receiving, from the base station, an updated customized function block, wherein the updated customized function block comprises a default function block and is based at least in part on the requested parameter associated with the UE; and processing a second signal at the UE based at least in part on the updated customized function block.

Aspect 5: The method of any of aspects 1 through 4, further comprising: receiving, from the base station, a second request to perform a handover to a second base station; and performing the handover to the second base station in response to receiving the second request.

Aspect 6: The method of aspect 5, further comprising: receiving, from the second base station, at least one of the customized function block or an updated customized function block based at least in part on performing the handover.

Aspect 7: The method of any of aspects 1 through 6, further comprising: measuring the requested parameter associated with the UE based at least in part on receiving the request; and including the requested parameter in the report based at least in part on the measuring.

Aspect 8: The method of any of aspects 1 through 7, wherein receiving the request for the parameter comprises: receiving the request via at least one of a DCI, an RRC signal, a MAC control element, or a combination thereof.

Aspect 9: The method of any of aspects 1 through 8, wherein transmitting the report indicating the requested parameter comprises: transmitting the report indicating the requested parameter via at least one of a medium access control (MAC) control element, an UCI, a PUSCH, or a combination thereof.

Aspect 10: The method of any of aspects 1 through 9, wherein the requested parameter comprises at least one of a location associated with the UE, a brand associated with the UE, a modem type associated with the UE, an antenna panel number associated with the UE, an antenna configuration associated with the UE, or a combination thereof.

Aspect 11: The method of any of aspects 1 through 10, wherein processing the one or more signals at the UE comprises: performing, at the UE, an operation associated with the one or more signals, the operation comprising at least one of a channel estimation, a channel state information compression, a coding, a decoding, or a combination thereof.

Aspect 12: The method of any of aspects 1 through 11, wherein receiving the customized function block comprises: receiving the customized function block via at least one of a PDSCH, an RRC signal, a DCI, or a combination thereof.

Aspect 13: The method of aspect 12, wherein the customized function block comprises a pre-trained customized function block for a cluster of UEs associated with the requested parameter.

Aspect 14: The method of any of aspects 1 through 13, wherein the customized function block comprises a function block customized using at least one of a neural network algorithm, an artificial intelligence algorithm, a reinforcement learning algorithm, or a combination thereof.

Aspect 15: A method for wireless communication at a base station, comprising: identifying one or more parameters associated with a UE; classifying the UE into a cluster of UEs based at least in part on identifying the one or more parameters; determining a customized function block based at least in part on classifying the UE into the cluster of UEs; and transmitting, to the UE, the customized function block based at least in part on determining the customized function block.

Aspect 16: The method of aspect 15, further comprising: determining that the cluster of UEs is associated with a pre-trained customized function block, wherein the customized function block comprises the pre-trained customized function block; transmitting, to the UE and after transmitting the customized function block, a request for an additional parameter associated with the UE; and receiving, from the UE, a report indicating the additional parameter based at least in part on transmitting the request.

Aspect 17: The method of aspect 16, further comprising: determining an updated customized function block based at least in part on receiving the additional parameter associated with the UE; and transmitting, to the UE, the updated customized function block based at least in part on determining the updated customized function block.

Aspect 18: The method of any of aspects 15 through 17, further comprising: determining that the cluster of UEs is not associated with a pre-trained customized function block, wherein transmitting the customized function block comprises transmitting a default function block; determining an updated customized function block based at least in part on the one or more parameters associated with the UE; and transmitting, to the UE, the updated customized function block based at least in part on determining the updated customized function block.

Aspect 19: The method of any of aspects 15 through 18, further comprising: transmitting, to a second base station, a handover request to handover the UE from the base station to the second base station; receiving, from the second base station, a handover response based at least in part on the handover request; and transmitting, to the second base station and based at least in part on receiving the handover response, the customized function block.

Aspect 20: The method of aspect 19, wherein transmitting the customized function block to the second base station comprises: transmitting, to the second base station, the customized function block via at least one of an Xn interface, a server, a component of a core network, or a combination thereof.

Aspect 21: The method of any of aspects 15 through 20, further comprising: transmitting, to a second base station, a handover request to handover the UE from the base station to the second base station; receiving, from the second base station, a handover response based at least in part on the handover request; and transmitting, to the second base station, the one or more parameters associated with the UE based at least in part on receiving the handover response.

Aspect 22: The method of any of aspects 15 through 21, wherein identifying the one or more parameters associated with the UE comprises: identifying at least one of an estimated location associated with the UE, a trajectory associated with the UE, a motion behavior associated with the UE, a channel condition associated with the UE, or a combination thereof.

Aspect 23: The method of any of aspects 15 through 22, wherein identifying the one or more parameters associated with the UE comprises: transmitting, to the UE, a request for the one or more parameters associated with the UE; and receiving, from the UE, a report indicating the requested one or more parameters, wherein classifying the UE into the cluster of UEs is based at least in part on the received one or more parameters.

Aspect 24: The method of aspect 23, wherein the requested one or more parameters comprises at least one of a location associated with the UE, a brand associated with the UE, a modem type associated with the UE, an antenna panel number associated with the UE, an antenna configuration associated with the UE, or a combination thereof.

Aspect 25: The method of any of aspects 15 through 24, wherein transmitting the customized function block comprises: transmitting the customized function block via at least one of a PDSCH, an RRC signal, a DCI, or a combination thereof.

Aspect 26: The method of any of aspects 15 through 25, wherein the customized function block comprises a function block customized using at least one of a neural network algorithm, an artificial intelligence algorithm, a reinforcement learning algorithm, or a combination thereof.

Aspect 27: An apparatus for wireless communication at a UE, comprising a processor; memory coupled with the processor; and instructions stored in the memory and executable by the processor to cause the apparatus to perform a method of any of aspects 1 through 14.

Aspect 28: An apparatus for wireless communication at a UE, comprising at least one means for performing a method of any of aspects 1 through 14.

Aspect 29: A non-transitory computer-readable medium storing code for wireless communication at a UE, the code comprising instructions executable by a processor to perform a method of any of aspects 1 through 14.

Aspect 30: An apparatus for wireless communication at a base station, comprising a processor; memory coupled with the processor; and instructions stored in the memory and executable by the processor to cause the apparatus to perform a method of any of aspects 15 through 26.

Aspect 31: An apparatus for wireless communication at a base station, comprising at least one means for performing a method of any of aspects 15 through 26.

Aspect 32: A non-transitory computer-readable medium storing code for wireless communication at a base station, the code comprising instructions executable by a processor to perform a method of any of aspects 15 through 26.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, from a base station, a first request for a parameter associated with the UE;
   transmitting, to the base station, a report indicating the requested parameter in response to receiving the first request;
   receiving, from the base station, a customized function block based at least in part on the transmitting the report, the customized function block comprising one or more functions to be performed by the UE, wherein the customized function block comprises a pre-trained customized function block associated with a cluster of UEs including the UE;

receiving, from the base station and after receiving the customized function block, a second request for an additional parameter associated with the UE;

transmitting, to the base station, a report indicating the additional parameter based at least in part on receiving the second request; and processing one or more signals at the UE based at least in part on the received customized function block.

2. The method of claim 1, further comprising:
receiving, from the base station, an updated customized function block, wherein the updated customized function block is based at least in part on the additional parameter associated with the UE; and
processing a second signal at the UE based at least in part on the updated customized function block.

3. The method of claim 1, further comprising:
receiving, from the base station, an updated customized function block, wherein the updated customized function block comprises a default function block and is based at least in part on the requested parameter associated with the UE; and
processing a second signal at the UE based at least in part on the updated customized function block.

4. The method of claim 1, further comprising:
receiving, from the base station, a second request to perform a handover to a second base station; and
performing the handover to the second base station in response to receiving the second request.

5. The method of claim 4, further comprising:
receiving, from the second base station, at least one of the customized function block or an updated customized function block based at least in part on performing the handover.

6. The method of claim 1, further comprising:
measuring the requested parameter associated with the UE based at least in part on receiving the first request; and
including the requested parameter in the report based at least in part on the measuring.

7. The method of claim 1, wherein receiving the first request for the parameter comprises:
receiving the first request via at least one of a downlink control information, a radio resource control signal, a medium access control (MAC) control element, or a combination thereof.

8. The method of claim 1, wherein transmitting the report indicating the requested parameter comprises:
transmitting the report indicating the requested parameter via at least one of a medium access control (MAC) control element, an uplink control information, a physical uplink shared channel, or a combination thereof.

9. The method of claim 1, wherein the requested parameter comprises at least one of a location associated with the UE, a brand associated with the UE, a modem type associated with the UE, an antenna panel number associated with the UE, an antenna configuration associated with the UE, or a combination thereof.

10. The method of claim 1, wherein processing the one or more signals at the UE comprises:
performing, at the UE, an operation associated with the one or more signals, the operation comprising at least one of a channel estimation, a channel state information compression, a coding, a decoding, or a combination thereof.

11. The method of claim 1, wherein receiving the customized function block comprises:
receiving the customized function block via at least one of a physical downlink shared channel, a radio resource control signal, a downlink control information, or a combination thereof.

12. The method of claim 1, wherein the customized function block comprises a function block customized using at least one of a neural network algorithm, an artificial intelligence algorithm, a reinforcement learning algorithm, or a combination thereof.

13. A method for wireless communication at a base station, comprising:
identifying one or more parameters associated with a user equipment (UE);
classifying the UE into a cluster of UEs based at least in part on identifying the one or more parameters, the cluster of UEs being associated with a pre-trained customized function block;
determining a customized function block based at least in part on classifying the UE into the cluster of UEs, the customized function block comprising one or more functions to be performed by the UE, wherein the customized function block comprises the pre-trained customized function block associated with the cluster of UEs;
transmitting, to the UE, the customized function block based at least in part on determining the customized function block;
transmitting, to the UE and after transmitting the customized function block, a request for an additional parameter associated with the UE; and
receiving, from the UE, a report indicating the additional parameter based at least in part on transmitting the request.

14. The method of claim 13, further comprising:
determining an updated customized function block based at least in part on receiving the additional parameter associated with the UE; and
transmitting, to the UE, the updated customized function block based at least in part on determining the updated customized function block.

15. The method of claim 13, further comprising:
transmitting, to a second base station, a handover request to handover the UE from the base station to the second base station;
receiving, from the second base station, a handover response based at least in part on the handover request; and
transmitting, to the second base station and based at least in part on receiving the handover response, the customized function block.

16. The method of claim 15, wherein transmitting the customized function block to the second base station comprises:
transmitting, to the second base station, the customized function block via at least one of an Xn interface, a server, a component of a core network, or a combination thereof.

17. The method of claim 13, further comprising:
transmitting, to a second base station, a handover request to handover the UE from the base station to the second base station;
receiving, from the second base station, a handover response based at least in part on the handover request; and transmitting, to the second base station, the one or more parameters associated with the UE based at least in part on receiving the handover response.

18. The method of claim 13, wherein identifying the one or more parameters associated with the UE comprises:
identifying at least one of an estimated location associated with the UE, a trajectory associated with the UE, a motion behavior associated with the UE, a channel condition associated with the UE, or a combination thereof.

19. The method of claim 13, wherein identifying the one or more parameters associated with the UE comprises:
transmitting, to the UE, a second request for the one or more parameters associated with the UE; and
receiving, from the UE, a report indicating the requested one or more parameters, wherein classifying the UE into the cluster of UEs is based at least in part on the received one or more parameters.

20. The method of claim 19, wherein the requested one or more parameters comprises at least one of a location associated with the UE, a brand associated with the UE, a modem type associated with the UE, an antenna panel number associated with the UE, an antenna configuration associated with the UE, or a combination thereof.

21. The method of claim 13, wherein transmitting the customized function block comprises:
transmitting the customized function block via at least one of a physical downlink shared channel, a radio resource control signal, a downlink control information, or a combination thereof.

22. The method of claim 13, wherein the customized function block comprises a function block customized using at least one of a neural network algorithm, an artificial intelligence algorithm, a reinforcement learning algorithm, or a combination thereof.

23. An apparatus for wireless communication at a user equipment (UE), comprising:
a processor,
memory coupled with the processor; and
instructions stored in the memory and executable by the processor to cause the apparatus to:
receive, from a base station, a first request for a parameter associated with the UE;
transmit, to the base station, a report indicating the requested parameter in response to receiving the first request;
receive, from the base station, a customized function block based at least in part on the transmitting the report, the customized function block comprising one or more functions to be performed by the UE, wherein the customized function block comprises a pre-trained customized function block associated with a cluster of UEs including the UE;
receiving, from the base station and after receiving the customized function block, a second request for an additional parameter associated with the UE;
transmitting, to the base station, a report indicating the additional parameter based at least in part on receiving the second request; and
process one or more signals at the UE based at least in part on the received customized function block.

24. An apparatus for wireless communication at a base station, comprising:
a processor,
memory coupled with the processor; and
instructions stored in the memory and executable by the processor to cause the apparatus to:
identify one or more parameters associated with a user equipment (UE);
classify the UE into a cluster of UEs based at least in part on identifying the one or more parameters, the cluster of UEs being associated with a pre-trained customized function block;
determine a customized function block based at least in part on classifying the UE into the cluster of UEs, the customized function block comprising one or more functions to be performed by the UE, wherein the customized function block comprises the pre-trained customized function block associated with the cluster of UEs;
transmit, to the UE, the customized function block based at least in part on determining the customized function block;
transmitting, to the UE and after transmitting the customized function block, a request for an additional parameter associated with the UE; and
receiving, from the UE, a report indicating the additional parameter based at least in part on transmitting the request.

* * * * *